(12) United States Patent
Thrash et al.

(10) Patent No.: US 8,220,588 B2
(45) Date of Patent: Jul. 17, 2012

(54) UNITIZED ENGINE NACELLE STRUCTURE

(75) Inventors: Patrick J. Thrash, Corona, CA (US); David Michael Miller, Chino Hills, CA (US)

(73) Assignee: The Boeing Company, Chicago, IL (US)

( * ) Notice: Subject to any disclaimer, the term of this patent is extended or adjusted under 35 U.S.C. 154(b) by 35 days.

(21) Appl. No.: 12/752,079

(22) Filed: Mar. 31, 2010

(65) Prior Publication Data
US 2011/0244150 A1    Oct. 6, 2011

(51) Int. Cl.
*E04B 1/82* (2006.01)
(52) U.S. Cl. .......... 181/292; 181/290; 244/1 N; 415/119
(58) Field of Classification Search ............... 181/292; 244/1 N; 415/119
See application file for complete search history.

(56) References Cited

U.S. PATENT DOCUMENTS

| | | | |
|---|---|---|---|
| 3,542,152 A | | 11/1970 | Adamson et al. |
| 3,831,710 A | | 8/1974 | Wirt |
| 3,966,522 A | * | 6/1976 | Hatch et al. ............... 156/148 |
| 4,946,526 A | * | 8/1990 | Petty-Galis et al. ......... 156/155 |
| 5,702,231 A | | 12/1997 | Dougherty |
| 5,888,610 A | * | 3/1999 | Fournier et al. ............. 428/116 |
| 5,910,095 A | * | 6/1999 | Strasser et al. .............. 60/272 |
| 6,607,625 B2 | * | 8/2003 | Andre et al. ................ 156/169 |
| 7,334,782 B2 | | 2/2008 | Woods et al. |
| 7,854,298 B2 | * | 12/2010 | Ayle .............................. 181/292 |
| 7,921,966 B2 | * | 4/2011 | Chiou et al. .................. 181/292 |
| 2002/0050420 A1 | * | 5/2002 | Porte et al. ................... 181/292 |
| 2005/0109557 A1 | * | 5/2005 | Dravet et al. ................ 181/292 |
| 2006/0118357 A1 | * | 6/2006 | Braun et al. ................. 181/290 |
| 2007/0108665 A1 | * | 5/2007 | Glain et al. .................. 264/405 |
| 2007/0141334 A1 | | 6/2007 | Kulesha |
| 2008/0179448 A1 | * | 7/2008 | Layland et al. .............. 244/1 N |
| 2009/0057487 A1 | | 3/2009 | Velicki et al. |

FOREIGN PATENT DOCUMENTS

| | | |
|---|---|---|
| EP | 1167185 A2 | 1/2002 |
| GB | 1406844 | 9/1975 |
| WO | 9101034 A2 | 1/1991 |

OTHER PUBLICATIONS

Nordstrom et al., "Conceptual Design Study of Advanced Acoustic-Composite Nacelles", NASA CR-132703, Jul. 1975, pp. 1-208.

Christensen et al., "Airplane Nacelle Composite Structure Technology", Conference on Polymeric Materials for Unusual Service Conditions, 1972, NASA, pp. 1-23.

PCT Search report dated Sep. 26, 2011 regarding International application No. PCT/US2011/030202 with International filed of Mar. 28, 2011.

* cited by examiner

*Primary Examiner* — Forrest M Phillips
(74) *Attorney, Agent, or Firm* — Yee & Associates, P.C.

(57) ABSTRACT

The different advantageous embodiments provide an inner barrel structure comprising an outer skin, an inner skin, a number of septa, and a truss core.

40 Claims, 19 Drawing Sheets

UNITIZED ENGINE NACELLE STRUCTURE

BACKGROUND INFORMATION

1. Field

The present disclosure relates generally to aircraft manufacturing and more specifically to manufacturing composite engine nacelle structures. Still more specifically, the present disclosure relates to an acoustically treated inner barrel structure for engine nacelles.

2. Background

An engine nacelle is a housing structure for an engine, such as a jet engine or turbine engine of an aircraft. The nacelle is required to withstand duct pressures and loads imposed upon it in flight and during ground handling. The nacelle is considered a secondary structure to the aircraft structures of the wings and fuselage.

Composite technology applications may be found in aircraft structures, including the nacelle. Non-metallic composites offer weight and cost savings for nacelle structures. However, the nacelle must still withstand the high pressure and high temperature conditions experienced during flight. The constraints upon nacelle design include strength, temperature, fire containment, noise reduction, sonic fatigue, damage tolerance and erosion.

Therefore, it is advantageous to have a method and apparatus that takes into account one or more of the issues discussed above, as well as possibly other issues.

SUMMARY

The different advantageous embodiments provide an inner barrel structure comprising an outer skin, an inner skin, a number of septa, and a truss core.

The different advantageous embodiments further provide a method for assembling a barrel structure. A number of layers of an inner skin fabric is laid down around a steel mold tool to form an inner skin. A number of mandrel sections with encapsulated septum detail is installed on the inner skin. A first number of radial ply closeouts is installed between each of the number of mandrel sections with encapsulated septum detail installed. A number of layers of truss core fabric is laid down over the number of mandrel sections with encapsulated septum detail to form a truss core. A number of mandrel sections is installed on the truss core. A second number of radial ply closeouts is installed between each of the number of mandrel sections. A number of layers of an outer skin fabric is laid down against the number of mandrel sections to form an outer skin.

The different advantageous embodiments further provide a method for forming a barrel structure. A vacuum bag is installed over a dry three-dimensional preform inner barrel structure on a steel mold tool. The dry three-dimensional preform inner barrel structure is placed inside an oven. The dry three-dimensional preform inner barrel structure is infused with resin to a form resin-infused inner barrel structure. The resin-infused inner barrel structure is cured to form an inner barrel. The inner barrel is removed from the oven. The vacuum bag is removed. A release ply is released from the inner barrel and the release ply and flow media are discarded. The inner barrel is removed from the steel mold tool. A number of holes are drilled in the inner skin and the outer skin of the inner barrel.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
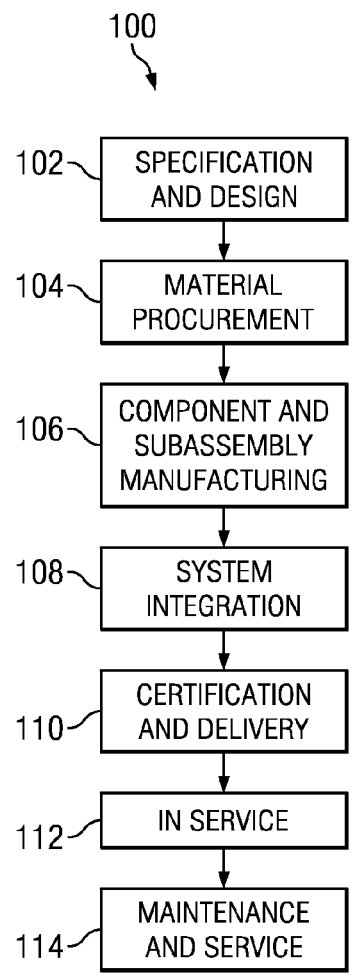
FIG. 1 is an illustration of an aircraft manufacturing and service method in accordance with an advantageous embodiment.
Figure 2:
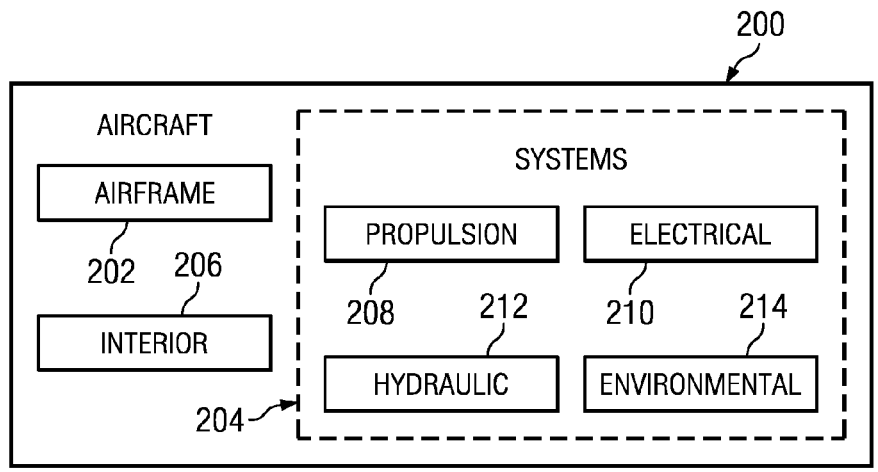
FIG. 2 is an illustration of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 may include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies, such as an engine nacelle, designed during specification and design 102 of aircraft 200 may be produced in component and subassembly manufacturing 106 in FIG. 1.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

The different advantageous embodiments take into account and recognize a number of different considerations. For example, the different advantageous embodiments take into account and recognize that current methods of design and production for engine nacelles involve a multi-step process utilizing pre-impregnated materials and multiple autoclave cures to produce a composite inner barrel structure. This current approach requires the use of core material in honeycomb or other form, often in two layers separated by a septum or mid-skin element to meet the structural and acoustic performance requirements. This approach also requires the use of an autoclave, which is expensive to operate and maintain with a limited supplier base.

The different advantageous embodiments further take into account and recognize that current core and septum materials are often sole sourced and expensive. The current methods require co-bonding of skins, such as inner and outer skins, mid-skin, and septum elements, in multiple steps using autoclave cure processes. The pre-impregnated materials, film adhesives, and other materials require subzero storage and have a limited "out-time" of approximately thirty days in which the materials must be laid up, vacuum bagged, and autoclave process cured. These requirements place time and cost constraints on the manufacturing of engine nacelle inner barrel structures.

Thus, the different advantageous embodiments provide an inner barrel structure comprising an inner skin, an outer skin, a number of septa, and a truss core.

The different advantageous embodiments further provide a method for assembling a barrel structure. A number of layers of fabric is laid down around a steel mold tool to form an inner skin. A number of mandrels with encapsulated septum detail are installed on the inner skin. A first number of radial ply closeouts are installed between each of the number of mandrels with encapsulated septum detail installed. A number of layers of fabric is laid down over the number of mandrels with encapsulated septum detail to form a truss core. A number of mandrels is installed on the truss core. A second number of radial ply closeouts is installed between each of the number of mandrels. A number of layers of fabric is laid down against the number of mandrels to form an outer skin.

The different advantageous embodiments further provide a method for forming a barrel structure. A vacuum bag is installed over the dry three-dimensional preform inner barrel structure on a steel mold tool. The dry three-dimensional preform inner barrel structure is placed inside an oven. The dry three-dimensional preform inner barrel structure is infused with resin to form resin-infused inner barrel structure. The resin-infused inner barrel structure is cured to form an inner barrel. The inner barrel is removed from the oven. The vacuum bag is removed. The release ply is removed from the inner barrel and the release ply and flow media are discarded. A number of holes are drilled in the inner skin and the outer skin of the inner barrel.

Figure 3:
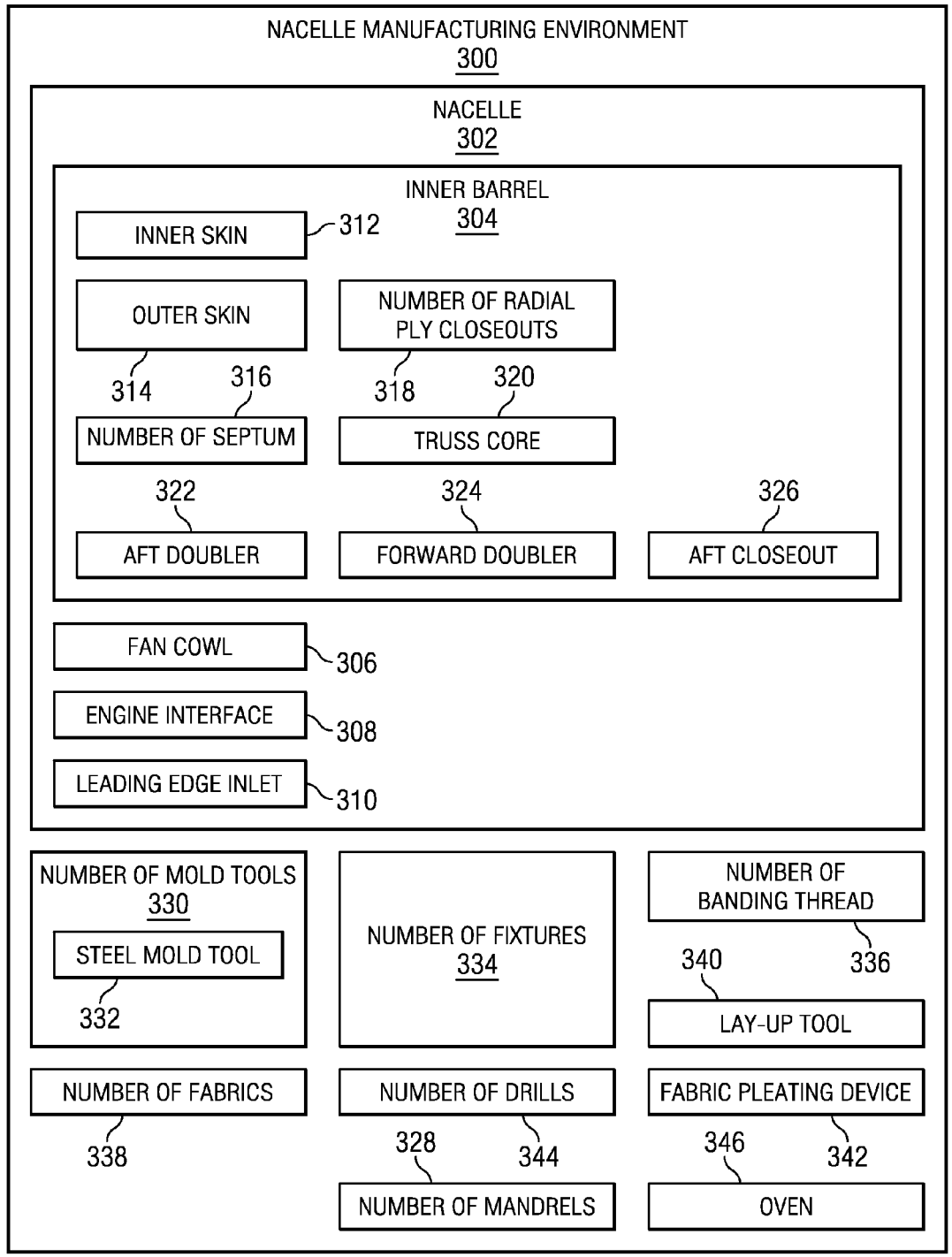
FIG. 3 is an illustration of a nacelle manufacturing environment in accordance with an advantageous embodiment.

With reference now to FIG. 3, an illustration of a nacelle manufacturing environment is depicted in accordance with an advantageous embodiment. Nacelle manufacturing environment 300 may be implemented during one or more phases of aircraft manufacturing and service method 100 in FIG. 1, such as specification and design 102 of aircraft 200 in FIG. 2 and/or component and subassembly manufacturing 106 in FIG. 1, for example.

Nacelle manufacturing environment 300 includes nacelle 302. Nacelle 302 may be an illustrative example of a nacelle structure manufactured in nacelle manufacturing environment 300. Nacelle 302 may include, without limitation, inner barrel 304, fan cowl 306, engine interface 308, leading edge inlet 310, and/or any other suitable component.

Inner barrel 304 is one of the components that define the forward section of nacelle 302. Inner barrel 304 connects a lower bolted interface of leading edge inlet 310 to the aft metal engine ring frame section to which it is also bolted, as described in more detail in FIG. 6 below. Fan cowl 306 connects leading edge inlet 310 to the aft metal ring frame completing the boxed section. Inner barrel 304 includes structural components such as, without limitation, inner skin 312, outer skin 314, number of septa 316, number of radial ply closeouts 318, truss core 320, aft doubler 322, forward doubler 324, and aft closeout 326.

Nacelle manufacturing environment 300 includes number of mandrels 328 used during the lay-up process of the structural components of inner barrel 304. Number of mandrels 328 may be, for example, without limitation, wax mandrels. In an illustrative example, number of mandrels 328 are used to install number of septa 316 on inner barrel 304. Nacelle manufacturing environment 300 also includes number of mold tools 330 used to manufacture inner barrel 304. Number of mold tools 330 may include, for example, steel mold tool 332. Number of fixtures 334 may be used to handle one or more structural components of inner barrel 304 during manufacturing. For example, number of fixtures 334 may position number of mandrels 318 during a lay-up process.

Number of banding thread 336 may be used to hold one or more structural components of inner barrel 304 in tension against each other and/or steel mold tool 332 during manufacturing of inner barrel 304. Number of fabrics 338 may be used to form one or more structural components of inner barrel 304. For example, number of fabrics 338 may form at least one of inner skin 312, outer skin 314, truss core 320, aft doubler 322, forward doubler 324, and/or any other suitable component. Number of fabrics 338 may be dry fabrics such as, for example, without limitation, a woven fabric, a uni-directional tape, warp/knit fabric, braided fabric, stitched fabric, and/or any other suitable fabric.

Lay-up tool 340 manipulates and positions number of fabrics 338 during manufacturing of inner barrel 304 to form one or more structural components of inner barrel 304. In an illustrative example, number of fabrics 338 may be implemented as rolls of fabric. Lay-up tool 340 may rotate a roll of fabric and/or number of mold tools 330 to wrap a number of layers of fabric around the mold tool to form a component of inner barrel 304, in this illustrative example.

Fabric pleating device 342 is a tool configured to place number of fabrics 338 over a corrugated shape without wrinkling the fabric. Fabric pleating device 342 may work simultaneously with lay-up tool 340 to manufacture one or more structural elements of inner barrel 304. Number of drills 344 is implemented to drill a number of holes in inner barrel 304. The number of holes may be drilled for acoustic performance, wax-melt out of wax mandrels, such as number of mandrels 328, and/or any other suitable purpose. Number of drills 344 may be a mechanical drill, laser drill, and/or any other suitable type of drilling tool. Oven 346 is used to cure the structural components of inner barrel 304 to produce the inner barrel structure.

The illustration of nacelle manufacturing environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in one advantageous embodiment, fabric pleating device 342 may be implemented as part of lay-up tool 342. In another advantageous embodiment, number of banding thread 336 may be incorporated into the manufactured product of nacelle 302, for example. In yet another illustrative example, number of mandrels 328 may include, without limitation, mandrels with encapsulated septum detail, pre-formed trapezoidal mandrels, wax mandrels, and/or any other suitable type of mandrel for inner barrel 304.

Figure 4:
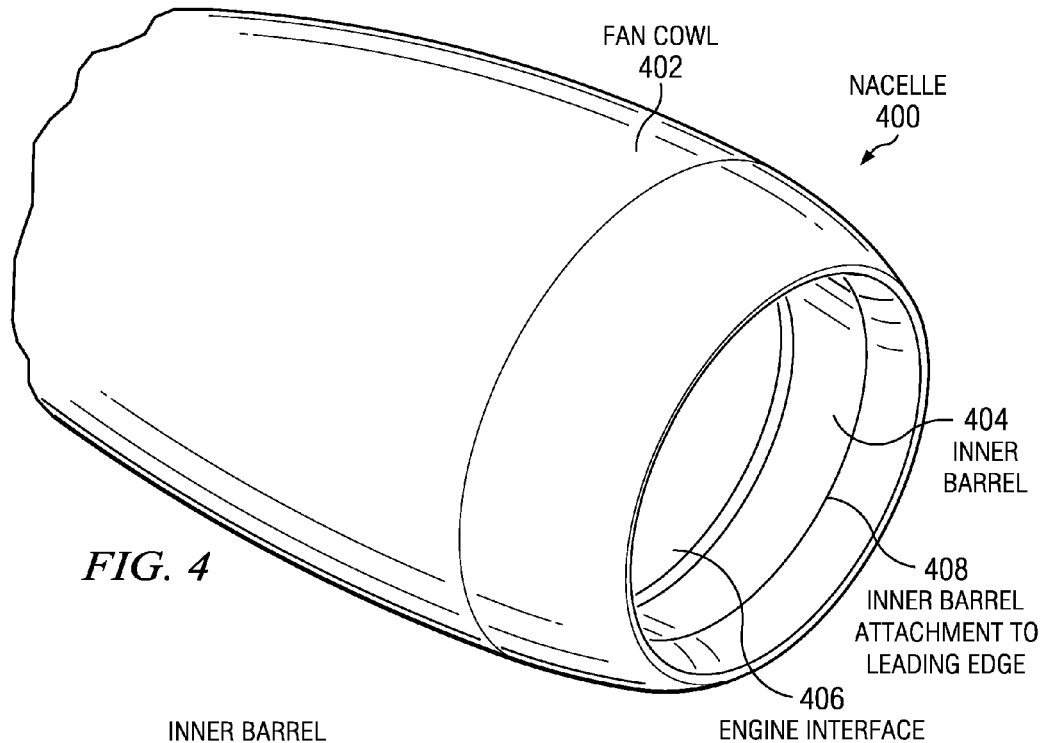
FIG. 4 is a nacelle in accordance with an advantageous embodiment.

With reference now to FIG. 4, a nacelle is depicted in accordance with an advantageous embodiment. Nacelle 400 is an illustrative example of one implementation of nacelle 302 in FIG. 3.

Nacelle 400 includes fan cowl 402, inner barrel 404, engine interface 406, and inner barrel attachment to leading edge 408. Fan cowl 402 is an illustrative example of one implementation of fan cowl 306 in FIG. 3. Fan cowl 402 is a covering for an engine of a vehicle, such as aircraft 200 in FIG. 2. Fan cowl 402 may provide, for example, without limitation, drag reduction, engine cooling, air intake, and/or any other function for an engine of an aircraft, such as aircraft 200 in FIG. 2, for example.

Inner barrel 404 is a structural feature of nacelle 400. Inner barrel 404 is an illustrative example of one implementation of inner barrel 304 in FIG. 3. Engine interface 406 is an illustrative example of one implementation of engine interface 308 in FIG. 3.

Inner barrel attachment to leading edge 408 is an illustrative example of one implementation of leading edge inlet 310 in FIG. 3. Inner barrel attachment to leading edge 408 is a circumferentially bolted interface which completes the inner aerodynamic surface feature for nacelle 400.

The illustration of nacelle 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Although nacelle 400 has been described with respect to aircraft, nacelle may be applied to other types of platforms. For example, without limitation, other advantageous embodiments may be applied to a mobile platform, a stationary platform, a land-based structure, an aquatic-based structure, a space-based structure and/or some other suitable object. More specifically, the different advantageous embodiments may be applied to, for example, without limitation, a spacecraft, a space station, a satellite, and a wind tunnel.

Figure 5:
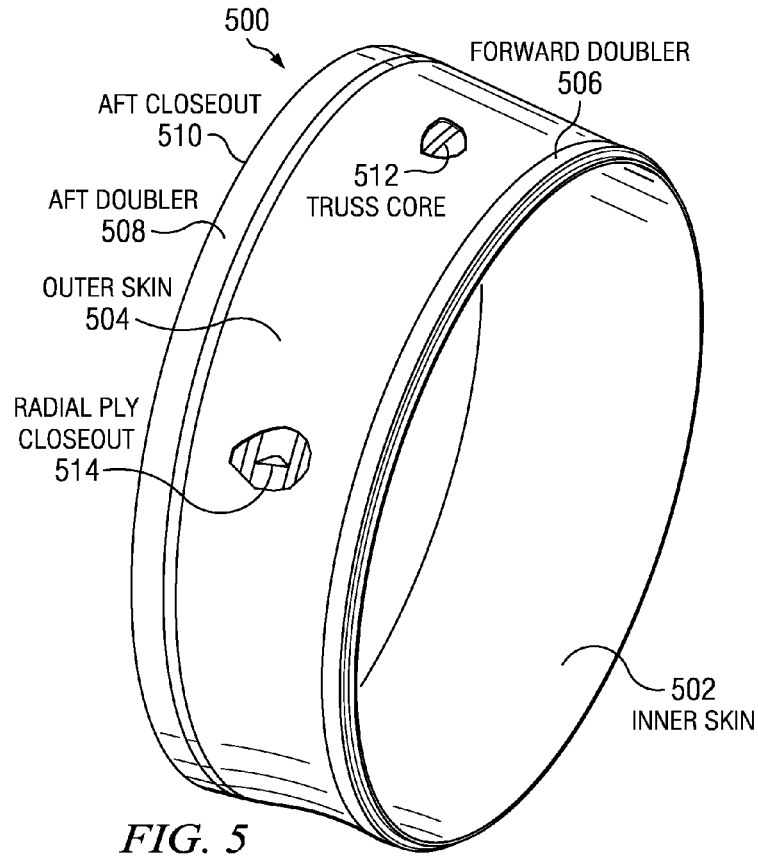
FIG. 5 is an inner barrel in accordance with an advantageous embodiment.

With reference now to FIG. 5, an inner barrel is depicted in accordance with an advantageous embodiment. Inner barrel 500 is an illustrative example of one implementation of inner barrel 304 in FIG. 3.

Inner barrel 500 includes inner skin 502, outer skin 504, forward doubler 506, aft doubler 508, aft closeout 510, and truss core 512. Inner skin 502 and outer skin 504 provide the outer surfaces of inner barrel 500. Inner skin 502 and outer skin 504 may be composed of, for example, a dry fabric that forms the skin elements for inner barrel 500. Examples of the dry fabric may include, without limitation, a woven fabric, a uni-directional tape, warp/knit fabric, braided fabric, stitched fabric, and/or any other suitable fabric. Fabric for inner skin 502 and outer skin 504 may be stored as a roll of fabric, in an advantageous embodiment.

Forward doubler 506 and aft doubler 508 are areas of inner barrel 500 implemented with additional fabric used to form inner skin 502 and outer skin 504. Forward doubler 506 and aft doubler 508 provide a reinforcing area to redistribute the bolt loads into the inner bear at the fore and aft locations.

As inner skin 502, outer skin 504, and truss core 512 terminate at the aft interface, aft closeout 510 forms a closeout ply of material to connect inner skin 502 and outer skin 504, completing the inner barrel assembly.

Truss core 512 is the part of the composite inner barrel structure that carries the loading between inner skin 502 and outer skin 504, providing stiffness for inner barrel 500. Radial ply closeout 514 may be implemented along the channels of truss core 512 as a division between continuous channels running the length of the interior of inner barrel 500. Radial ply closeout 514 provides acoustic abatement for inner barrel 500.

The illustration of inner barrel 500 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
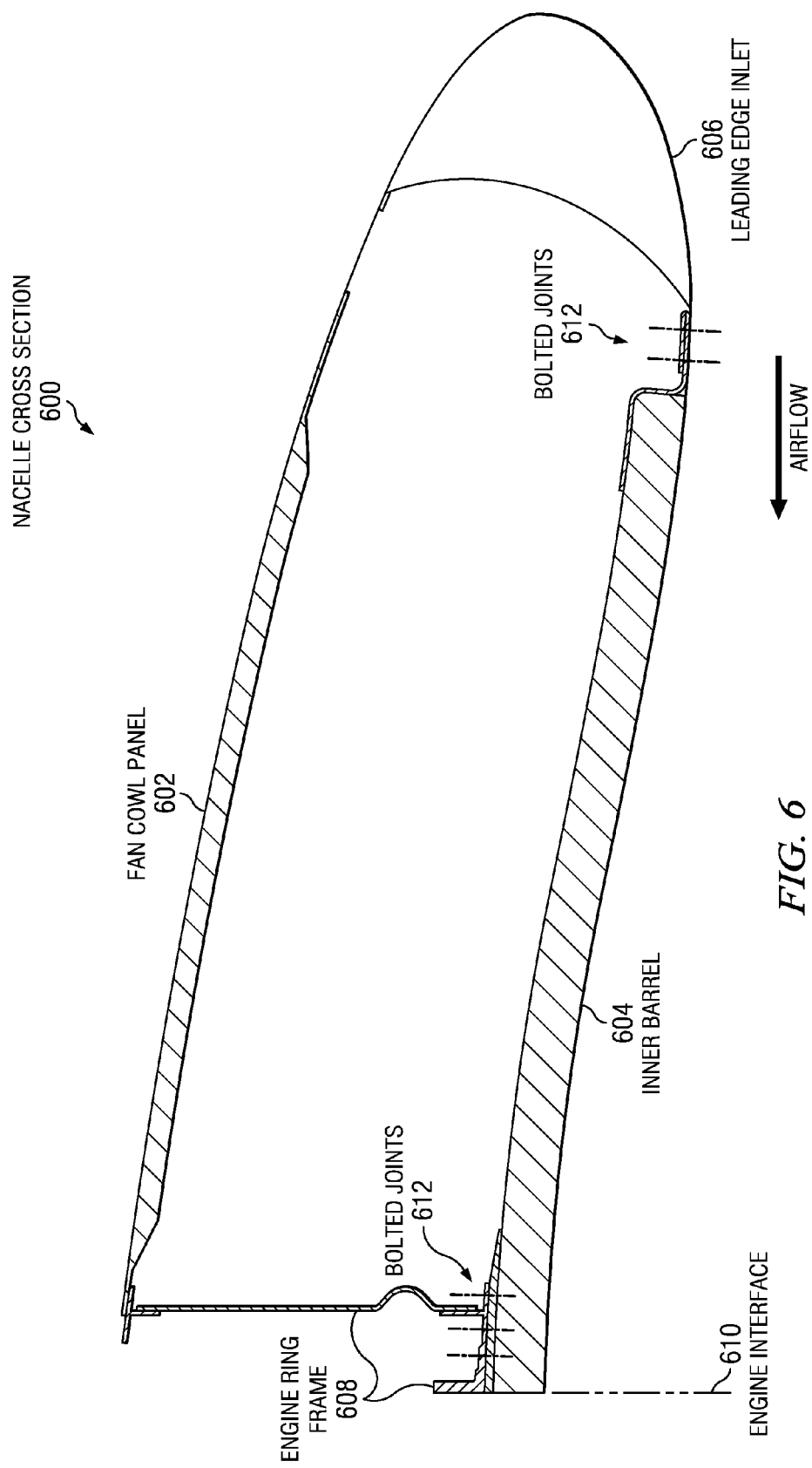
FIG. 6 is a nacelle cross section in accordance with an advantageous embodiment.

With reference now to FIG. 6, a nacelle cross section is depicted in accordance with an advantageous embodiment. Nacelle cross section 600 may be an illustrative example of a cross-sectional view of nacelle 400 in FIG. 4.

Nacelle cross section 600 depicts a cross-sectional view of fan cowl panel 602, inner barrel 604, leading edge inlet 606, engine ring frame 608, and engine interface 610. Inner barrel 604 connects with leading edge inlet 606 and engine ring frame 608 using bolted joints 612. Fan cowl 602 connects leading edge inlet 606 to engine ring frame 608, completing the boxed section.

The illustration of nacelle cross section 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 7:
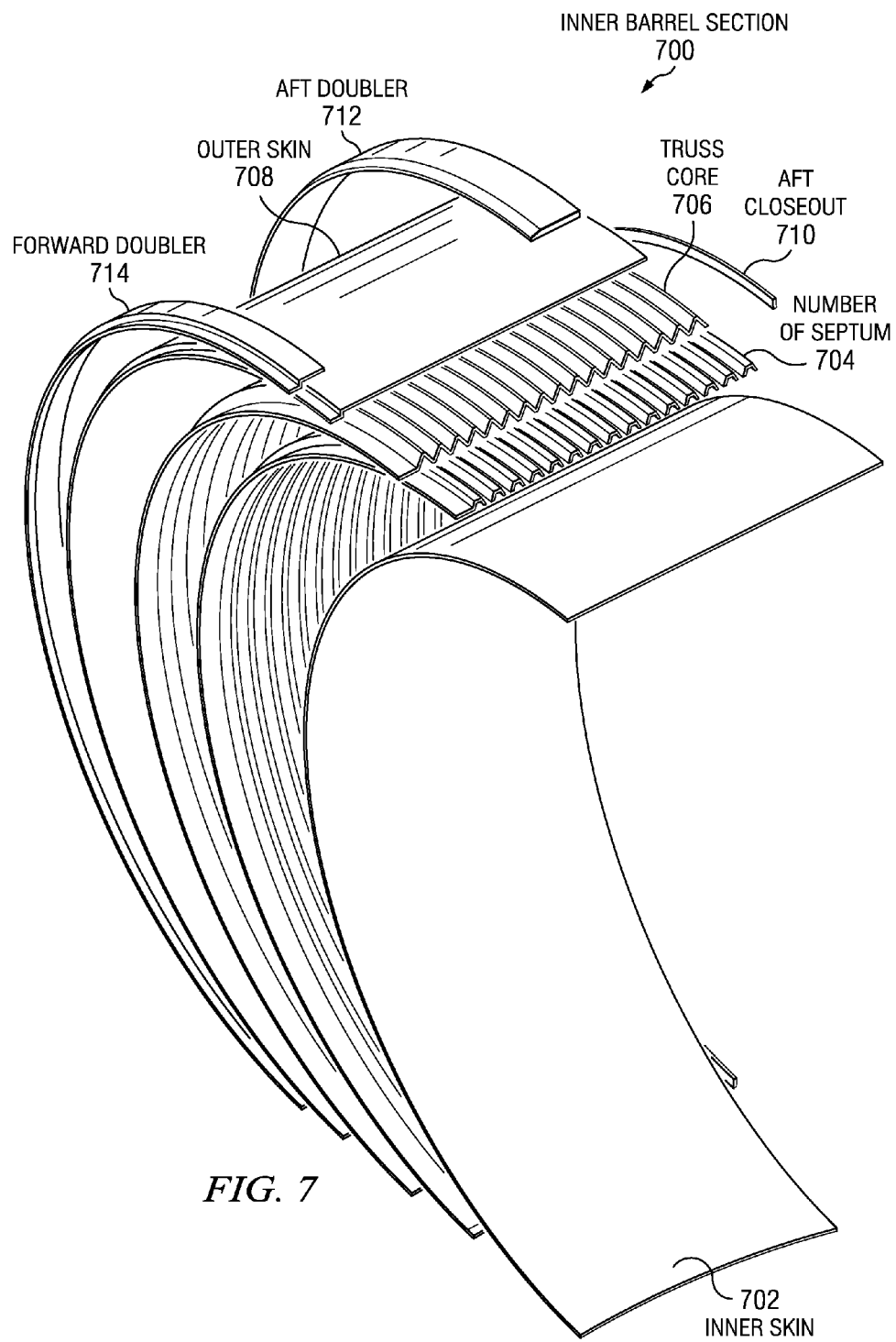
FIG. 7 is an inner barrel section in accordance with an advantageous embodiment.

With reference now to FIG. 7, an inner barrel section is depicted in accordance with an advantageous embodiment. Inner barrel section 700 is an illustrative example of one implementation of a section of inner barrel 500 in FIG. 5. Inner barrel section 700 provides a layered view depicting the elements of inner barrel 500 in FIG. 5.

Inner barrel section 700 includes inner skin 702, number of septa 704, truss core 706, outer skin 708, aft closeout 710, aft doubler 712, and forward doubler 714. Inner skin 702 is an illustrative example of one implementation of inner skin 502 in FIG. 5. Outer skin 708 is an illustrative example of one implementation of outer skin 504 in FIG. 5.

Each truss core cavity against inner skin 702 contains multiple septum details, implemented as number of septa 704. In an illustrative example, a mandrel with an encapsulated septum detail may be utilized in each quadrant for a total of four septum details per truss core cavity. In this illustrative example, an inner barrel structure may be divided into four quadrants, with each quadrant together forming the complete 360 degree barrel. The mandrels may be implemented along the inner skin in sections, with four sections providing complete mandrel coverage around the inner barrel structure, in this example. A fixture, such as number of fixtures 334 in FIG. 3, may be used to install each mandrel section along the inner skin, with four separate installations, one for each quadrant of the inner barrel structure. Number of truss core cavities is dependent upon nacelle application. Number of septa 704 may be, for example, without limitation, an extruded thermoplastic material.

Truss core 706 is a dry fabric that forms the truss element of inner barrel section 700. Truss core 706 may be, for example, without limitation, a woven fabric, a uni-directional tape, warp/knit fabric, braided fabric, stitched fabric, and/or any other suitable fabric. In one illustrative example, truss core 706 may be comprised of warp/knit fabric.

Aft closeout 710 is an illustrative example of one implementation of aft closeout 510 in FIG. 5. Aft doubler 712 is an illustrative example of one implementation of aft doubler 508 in FIG. 5. Forward doubler 714 is an illustrative example of one implementation of forward doubler 506 in FIG. 5.

Each of inner skin 702, number of septa 704, truss core 706, outer skin 708, aft closeout 710, aft doubler 712, and forward doubler 714 may be assembled in a three-dimensional shape, such as the shape depicted by inner barrel 400 in FIG. 4, in a dry pre-form process. Resin infusion and thermal cure may follow a dry pre-form process to mold the elements of inner barrel section 500 into a unitized structure.

The illustration of inner barrel section 700 in FIG. 7 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 8:
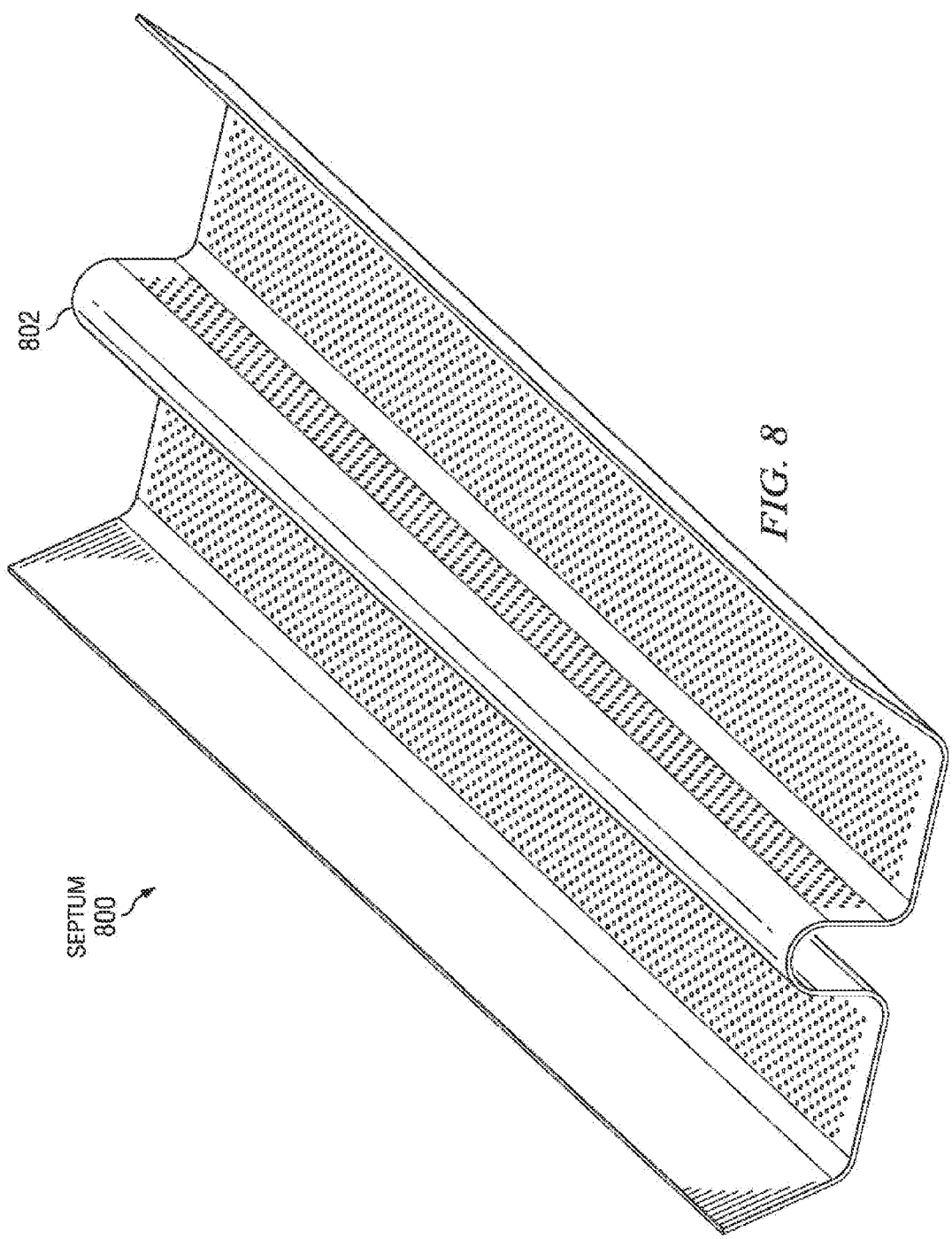
FIG. 8 is a septum in accordance with an advantageous embodiment.

With reference now to FIG. 8, a septum detail is depicted in accordance with an advantageous embodiment. Septum 800 is an illustrative example of a portion of a septum, such as number of septa 704 in FIG. 7.

Septum 800 is positioned between the inner and outer skins of an inner barrel structure, such as inner barrel 500 in FIG. 5. Septum 800 is located inside the truss core cavities against the inner skin, such as inner skin 702 in FIG. 7, for example. Septum 800 is a prefabricated detail that contains perforations, or holes, at discrete locations for specific acoustic properties. Septum 800 may be made from, for example, without limitation, thermoplastic material using an extrusion process, or any other suitable material and/or process. The number of holes may be drilled using, for example, without limitation, a mechanical drill, a laser, and/or any other suitable tool for creating holes. The shape of septum 800 is optimized for surface area, strength, and stiffness to provide specific acoustic properties for the inner barrel structure.

Septum 800 may be configured to provide single or multiple chambers, in an illustrative example as shown in FIG. 8. The example depicted for septum 800 illustrates a two chamber design. More specifically, in a number of embodiments the septa 800 may include a stiffening portion 802. As shown in the example, the stiffening portion 802 may be configured substantially channel-like or U shaped, and may further be configured to include acoustically configured perforations. In some embodiments, the stiffening portion 802 may contact the inner skin (see, e.g., FIG. 11 below).

The illustration of septum 800 in FIG. 8 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 9:
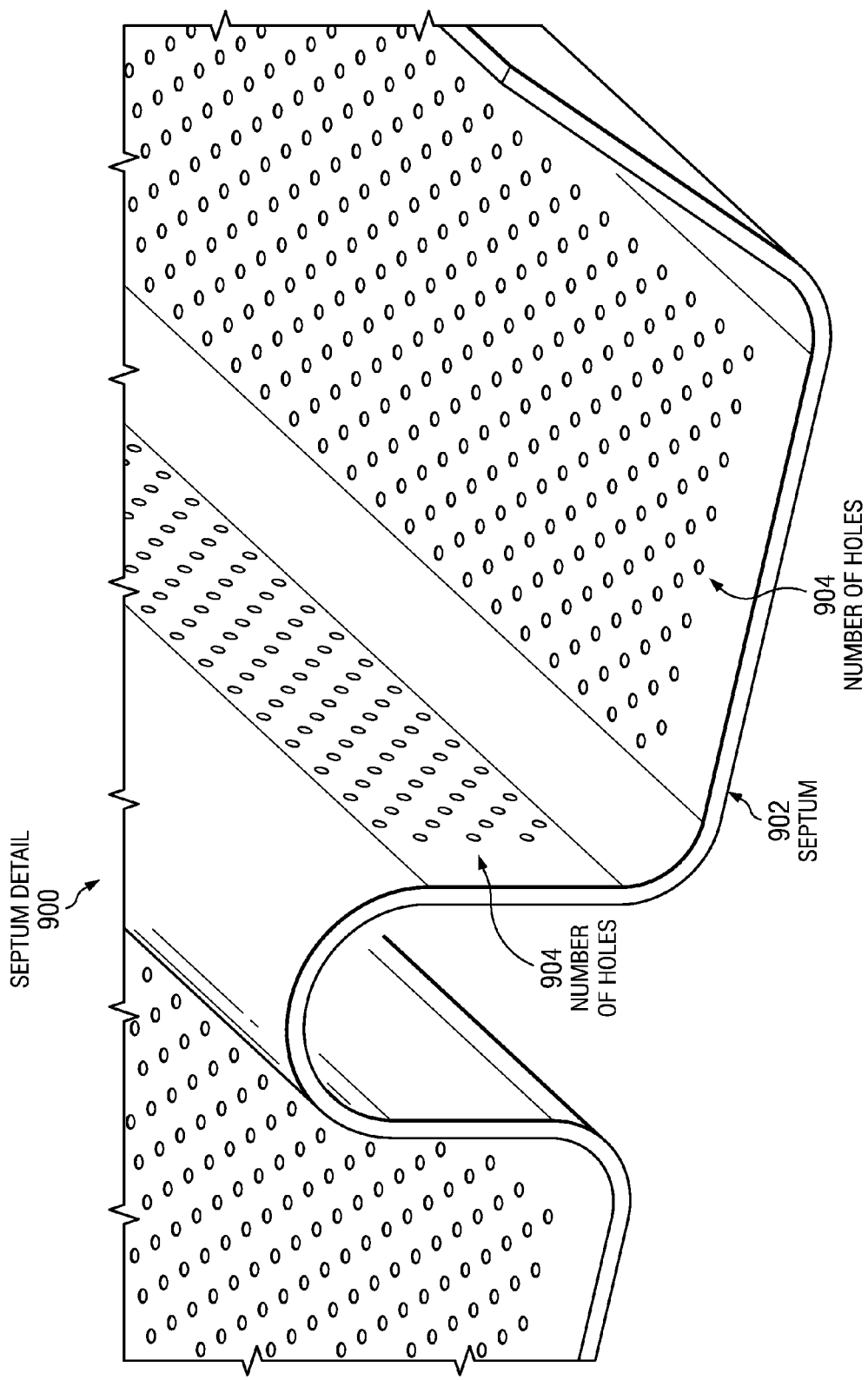
FIG. 9 is a septum detail in accordance with an advantageous embodiment.

With reference now to FIG. 9, a septum detail is depicted in accordance with an advantageous embodiment. Septum detail 900 depicts a portion of septum 800 in FIG. 8. Septum 902 is an illustrative example of a detailed view of septum 800 in FIG. 8.

Number of holes 904 is disposed along horizontal and vertical surfaces of septum 902 and pass through the thickness of the septum material, thereby configuring the septum 902 for attenuating noise. Number of holes 904 is an illustrative example of holes drilled after fabrication of septum 902. The hole pattern and hole size for number of holes 904 is pre-determined in order to meet the acoustic performance requirement for the nacelle inner barrel application. Number of holes 904 in septum 902 may also enable draining of the molten wax material from the wax mandrels during the "post cure" melt out process at an elevated temperature. Number of holes 904 may be placed at any number of locations along septum surfaces and at any spacing and/or frequency.

The illustration of septum detail 900 in FIG. 9 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 10:
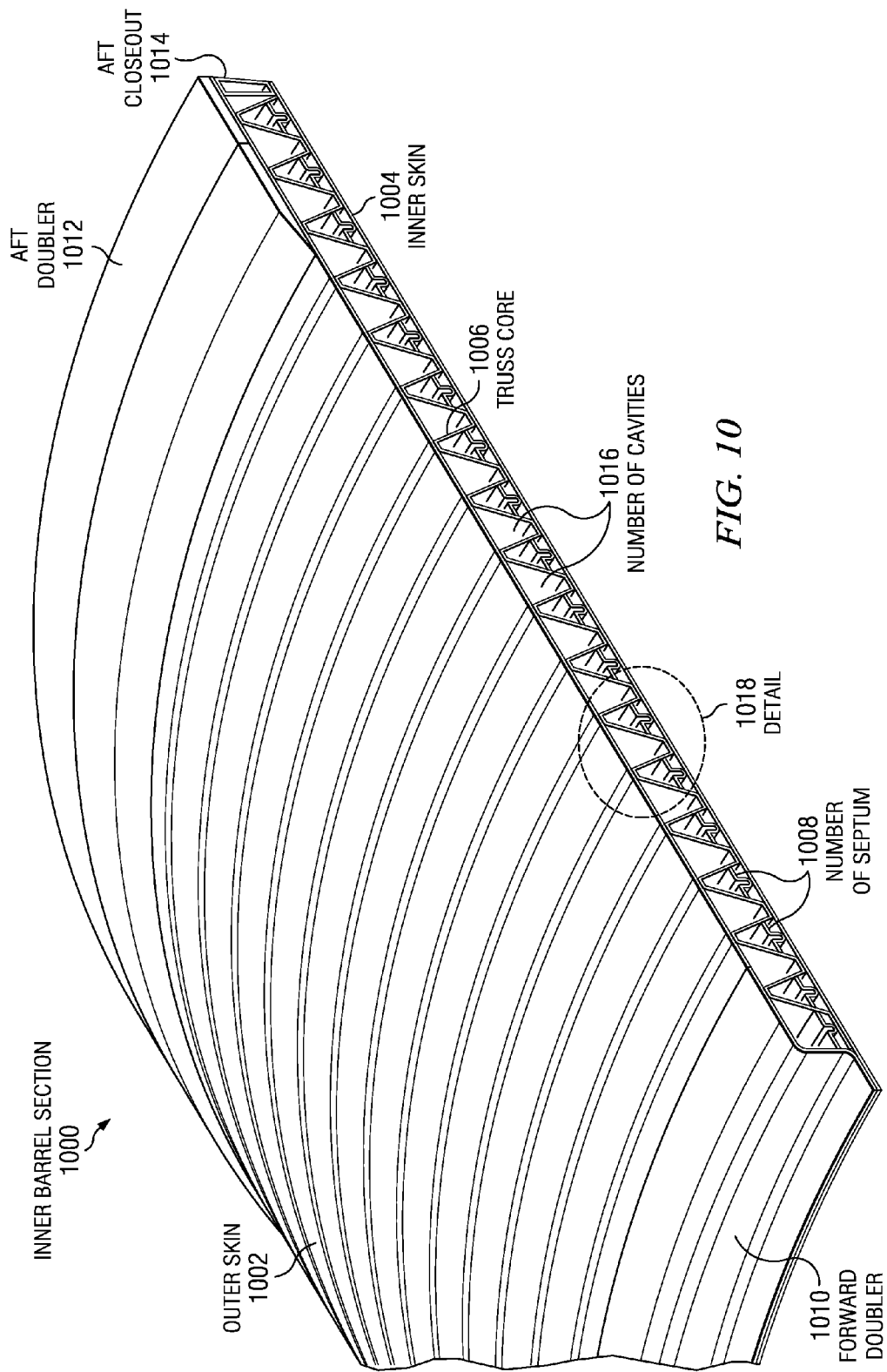
FIG. 10 is an inner barrel section in accordance with an advantageous embodiment.

With reference now to FIG. 10, an inner barrel section is depicted in accordance with an advantageous embodiment. Inner barrel section 1000 is an illustrative example of one implementation of a section of inner barrel 500 in FIG. 5. Inner barrel section 1000 may be considered an alternate view from inner barrel section 700 in FIG. 7 of a section of inner barrel 500 in FIG. 5, for example.

Inner barrel section 1000 depicts outer skin 1002, inner skin 1004, truss core 1006, number of septa 1008, forward doubler 1010, aft doubler 1012, and aft closeout 1014 in a unitized, or post-cure, form. The unitized structure depicted in inner barrel section 1000 provides a single joint interface for each of inner skin 1004, outer skin 1002, and truss core 1006, without multiple splice joints.

The implementation of truss core 1006 creates number of cavities 1016, in this illustrative example. Number of cavities 1016 may contain wax mandrels during the dry assembly and initial cure processes. These wax mandrels may be melted out in a post-cure process, resulting in number of cavities 1016. Number of cavities 1016 are segmented, or divided, perpendicularly by radial ply closeouts, discussed in more detail in the figures that follow. These radial ply closeouts prevent a continuous cavity around the inner barrel structure, which would result in acoustic abatement if not for the division of the cavity structure within the inner barrel. To achieve optimum acoustic abatement, dissipation of acoustic energy as heat in the pores of the material is directly related to its resistance to air flow. In a honeycomb structure this is achieve inherently by the individual honeycomb cell. The truss core design is inherently two-dimensional since the cavities are circumferential. Thus, a radial ply completes the three-dimensional closeout and increases flow resistance.

Wax film removal techniques may be applied to inner barrel section 1000 after the wax mandrels have been melted out to remove any residual wax film on the inner surfaces of the part. The wax film removal techniques may include, for example, without limitation, a solvent bath, ultrasonic cleaning, and/or any other suitable technique. In one advantageous embodiment, acoustic treatment of inner barrel section 1000 may include inserting materials into number of cavities 1016 after the melt-out and wax film removal processes are completed. In an illustrative example, a bulk absorber material may be blown into number of cavities 1016 of inner barrel section 1000 to provide additional acoustic performance for the complete inner barrel, such as inner barrel 500 in FIG. 5. The acoustic impedance in the axial and circumferential direction is enhanced by the bulk absorber over wider engine operating conditions. In one illustrative example, a bulk absorber may result in a two perceived noise decibel (PNdB) reduction in noise level. The bulk absorber material may be, for example, without limitation, treated Kevlar fiber matt, aluminized fiberglass matt, nickel plated graphite matt, and/or any other suitable absorber material used for acoustic performance.

Detail 1018 is a portion of inner barrel section 1000 presented with more detail in FIG. 11 below.

The illustration of inner barrel section 1000 in FIG. 10 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 11:
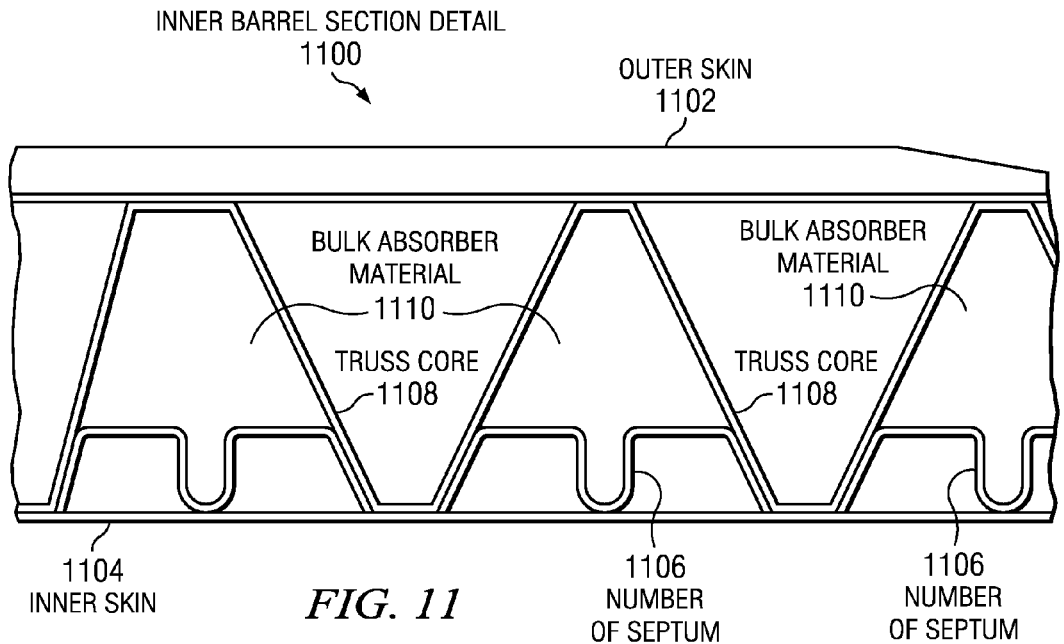
FIG. 11 is an inner barrel section detail in accordance with an advantageous embodiment.

With reference now to FIG. 11, an inner barrel section detail is depicted in accordance with an advantageous embodiment. Inner barrel section detail 1100 provides a detailed view of detail 1018 for inner barrel section 1000 in FIG. 10. Inner barrel section detail 1100 is an illustrative example of one implementation of the elements depicted in inner barrel section 700 in FIG. 7 and inner barrel section 1000 in FIG. 10.

Inner barrel section detail 1100 depicts outer skin 1102 and inner skin 1104 disposed as the outer surfaces of an inner barrel section. Number of septa 1106 is an illustrative example of one implementation of number of septa 704 in FIG. 7 and/or number of septa 1008 in FIG. 10. During assembly of dry fabric elements to form the inner barrel section, wax mandrels may be used to support the truss structure formed by truss core 1108 within outer skin 1102 and inner skin 1104. Wax mandrels with encapsulated septum may be positioned over inner skin 1104 for the lay-up of truss core 1108, and later melted out during a post-cure process. Bulk absorber material 1110 may be blown into the cavities that remain when the wax mandrels are melted out, providing additional acoustic performance features.

Truss core 1108 is an illustrative example of one implementation of truss core 706 in FIG. 7 and/or truss core 1006 in FIG. 10. Truss core 1108 may be applied over the corrugated shape provided by wax mandrels positioned over inner skin 1104 during lay-up.

The illustration of inner barrel section detail 1100 in FIG. 11 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 12:
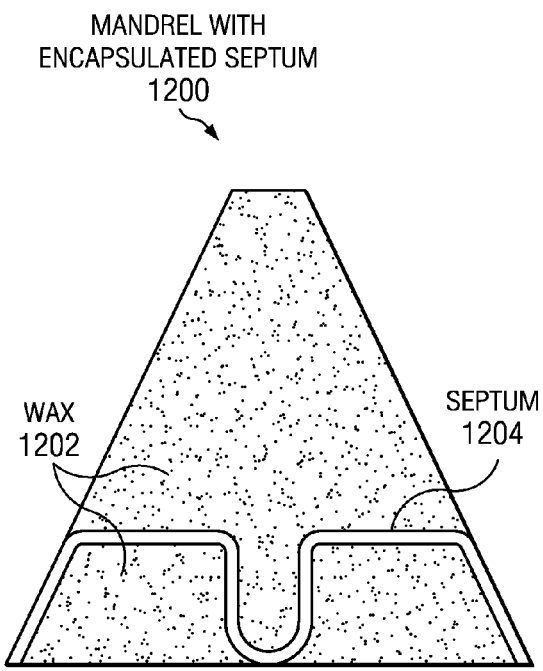
FIG. 12 is a mandrel with encapsulated septum in accordance with an advantageous embodiment.

With reference now to FIG. 12, a mandrel with encapsulated septum is depicted in accordance with an advantageous embodiment. Mandrel with encapsulated septum 1200 is an illustrative example of one implementation of wax mandrels with encapsulated septum that are placed on inner skin 1104 in FIG. 11. In this depiction, wax 1202 is encapsulated with septum 1204, as shown. Septum 1204 may be an illustrative example of one implementation of number of septa 704 in FIG. 7 and/or septum 800 in FIG. 8.

The illustration of mandrel with encapsulated septum 1200 in FIG. 12 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 13:
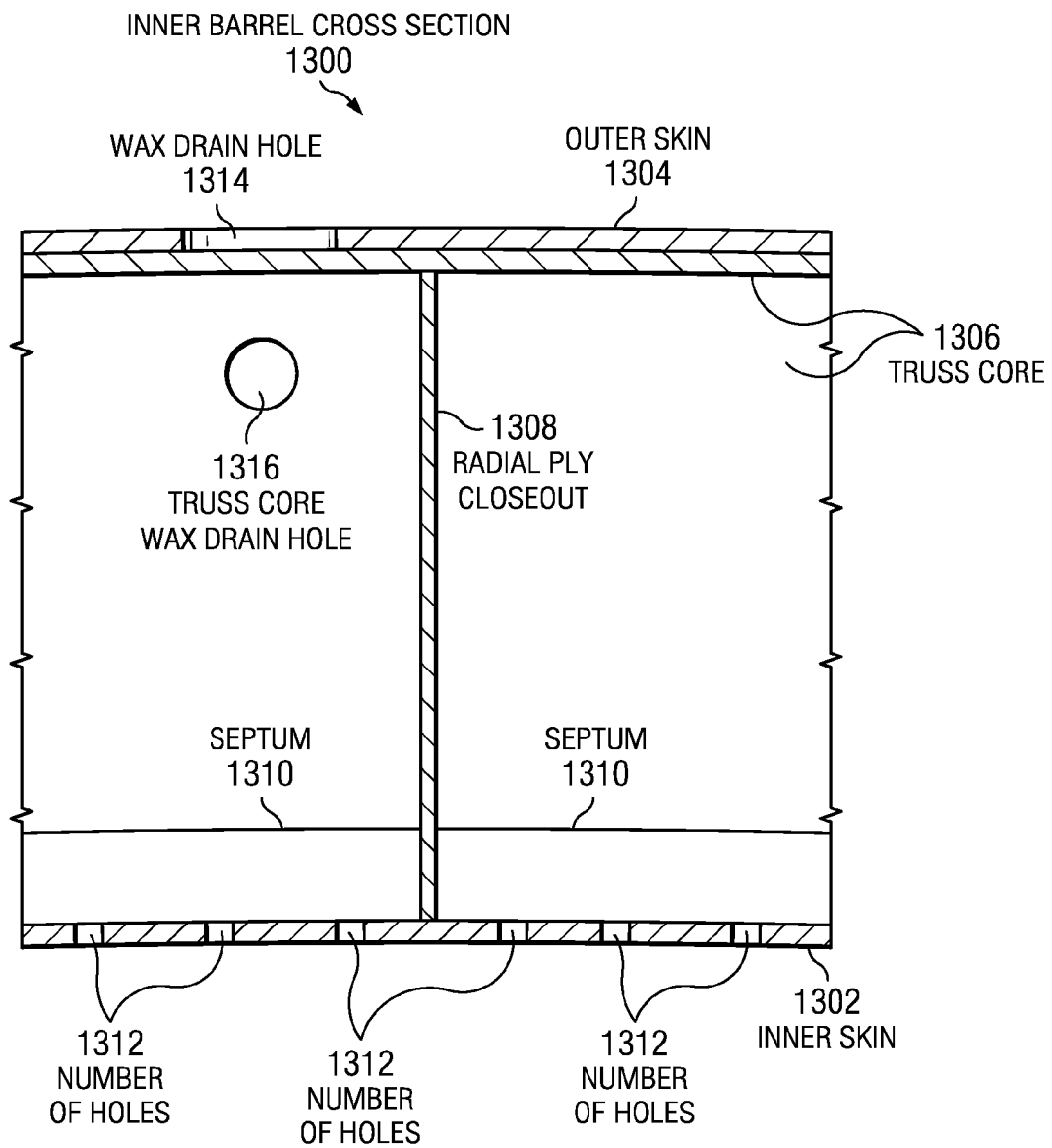
FIG. 13 is an inner barrel cross-section in accordance with an advantageous embodiment.

With reference now to FIG. 13, an inner barrel cross-section is depicted in accordance with an advantageous embodiment. Inner barrel cross-section 1300 is an illustrative example of one implementation of the elements depicted in inner barrel section 700 in FIG. 7 and inner barrel section 1000 in FIG. 10.

Inner barrel cross-section 1300 depicts inner skin 1302 and outer skin 1304. Inner skin 1302 is an illustrative example of one implementation of inner skin 702 in FIG. 7 and/or inner skin 1004 in FIG. 10. Septum 1310 is disposed along inner skin 1302. Outer skin 1304 is an illustrative example of one implementation of outer skin 708 in FIG. 7 and/or outer skin 1002 in FIG. 10.

Truss core 1306 is a cross section view of truss core 1006 in FIG. 10. Truss core 1306 is corrugated about a number of wax mandrels during a lay-up process. The wax mandrels are implemented in sections divided by radial ply closeout 1308. Radial ply closeout 1308 is an illustrative example of an element installed at the same time as the wax mandrels. Radial ply closeout 1308 may be, for example, without limitation, a dry carbon fiber that is resin infused during a resin infusion process, a thermoplastic material similar to number of septa 704 in FIG. 7, and/or any other suitable material.

Radial ply closeout 1308 creates a wall perpendicular to inner skin 1302 and outer skin 1304 that provides a division in the cavities formed when the wax mandrels are melted out in a post-cure process.

Number of holes 1312 is disposed along inner skin 1302 pass through the thickness of inner skin 1302. Number of holes 1312 is an illustrative example of holes drilled after an initial resin infusion cure cycle. The hole pattern and hole size for number of holes 1312 is determined in order to meet the acoustic performance requirement for the nacelle inner barrel application. Number of holes 1312 in inner skin 1302 may also enable draining of the molten wax material from the wax mandrels during the "post cure" melt out process at elevated temperature. Number of holes 1312 may be placed at any number of locations along inner skin 1302 and at any spacing and/or frequency.

Wax drain hole 1314 implemented in outer skin 1304 and truss core wax drain hole 1316 are illustrative examples of a number of holes used to assist in the wax melt-out during a post-cure process. Wax drain hole 1314, truss core wax drain hole 1316, and number of holes 1312 may be drilled using, for example, without limitation, a mechanical drill, a laser, and/or any other suitable tool for creating holes. Number of holes 1312 may also be formed in-situ with the resin infusion process using pin mats positioned between the steel mold tool and inner skin 1302, in another advantageous embodiment. The pin mat is subsequently removed after resin infusion.

Number of holes 1312, wax drain hole 1314, and truss core wax drain hole 1316 are provided for illustrative purposes only and do not limit the number, location, frequency, size, and/or any other configuration of holes that may be drilled for wax melt-out and/or acoustic treatment.

The illustration of inner barrel section cross-section 1300 in FIG. 13 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 14A:
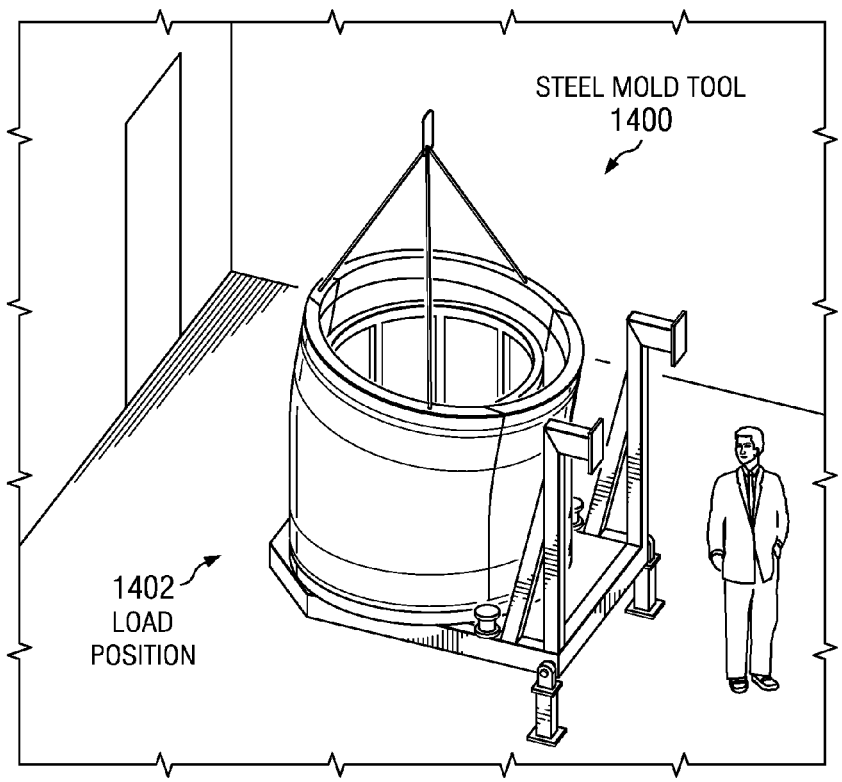
FIGS. 14A and 14B are a steel mold tool in accordance with an advantageous embodiment.
Figure 14B:
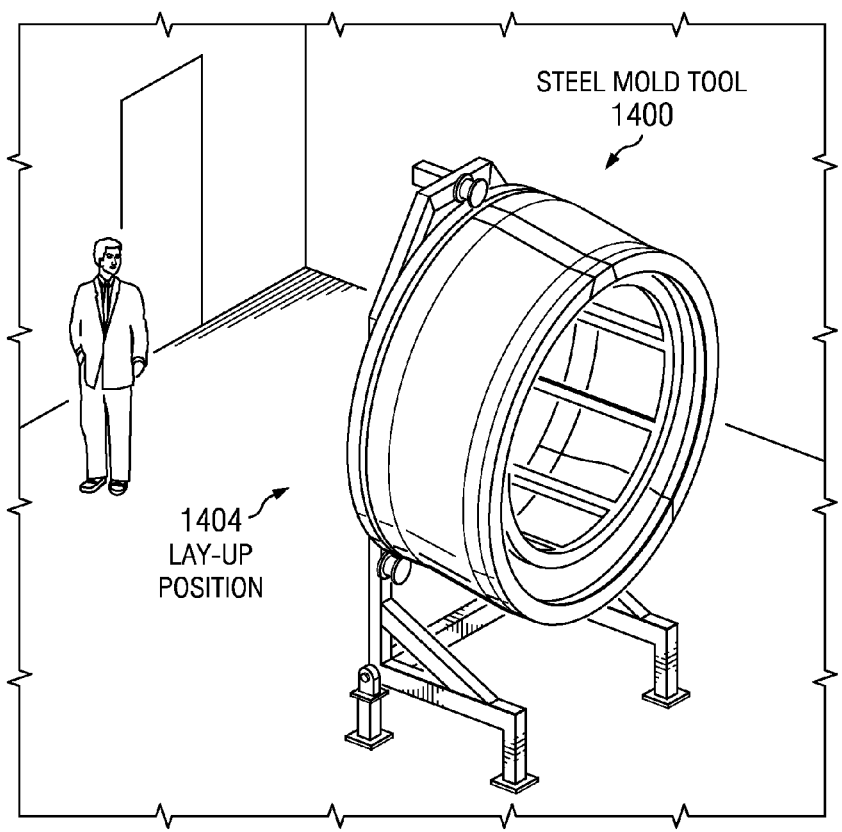

With reference now to FIGS. 14A and 14B, a steel mold tool is depicted in accordance with an advantageous embodiment. Steel mold tool 1400 may be implemented during component and subassembly manufacturing 106 in FIG. 1 of inner barrel 500 in FIG. 5, for example.

Steel mold tool 1400 is depicted in load position 1402 in FIG. 14A and lay-up position 1404 in FIG. 14B. Steel mold tool 1400 may be implemented in lay-up position 1404 for dry assembly of inner barrel elements, such as inner skin 702, number of septa 704, truss core 706, outer skin 708, aft closeout 710, aft doubler 712, and forward doubler 714 in FIG. 7. Steel mold tool 1400 may be implemented in load position 1402 for unitizing process, such as vacuum bagging, oven cure, thermal cure, post-cure wax melt-out, and/or any other suitable process.

The illustration of steel mold tool 1400 in FIGS. 14A and 14B is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 15A:
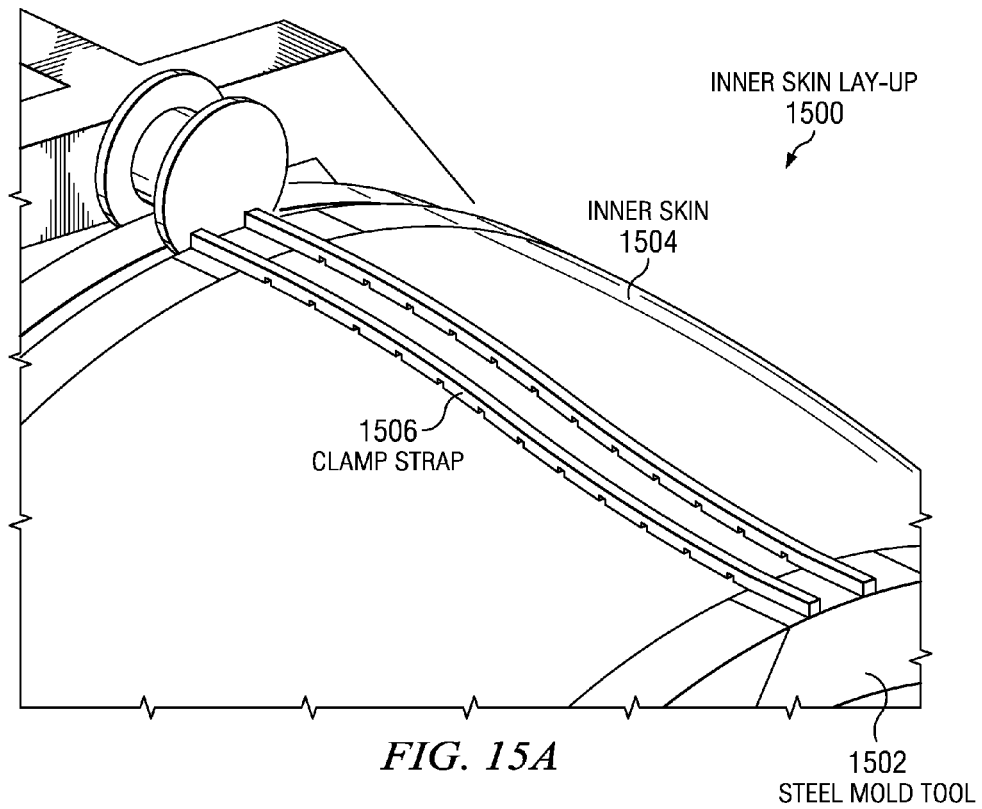
FIGS. 15A and 15B are an inner skin lay-up in accordance with an advantageous embodiment.
Figure 15B:
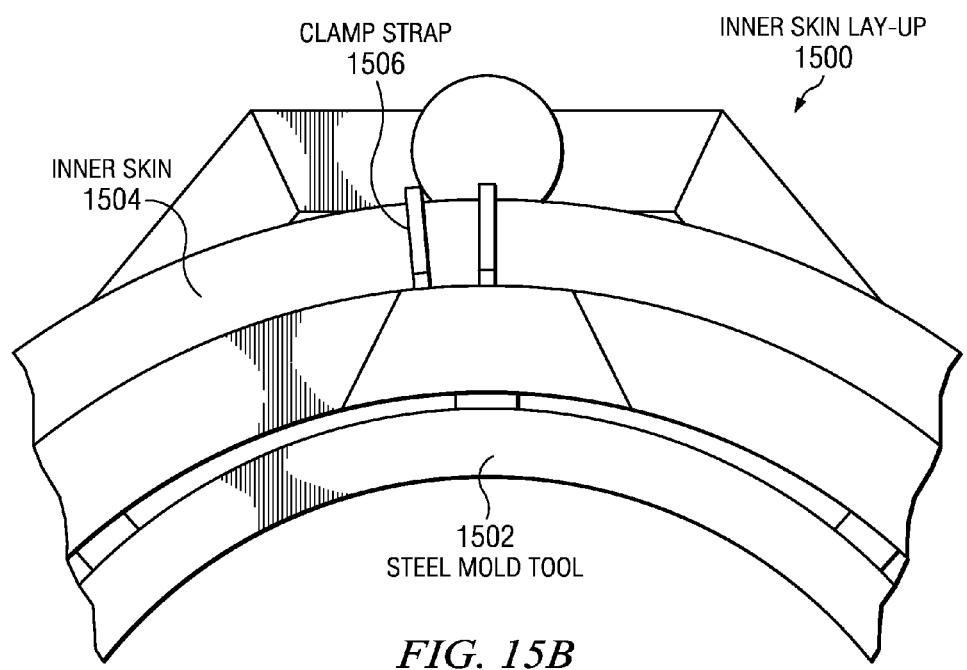

With reference now to FIGS. 15A and 15B, an inner skin lay-up is depicted in accordance with an advantageous embodiment. Inner skin lay-up 1500 depicts one implementation of the application of inner skin 702 in FIG. 7, for example.

Steel mold tool 1502 may be implemented in lay-up position, such as lay-up position 1404 in FIG. 14B. Inner skin 1504 is applied to steel mold tool 1502 and secured using clamp strap 1506. Inner skin 1504 may be stored as a roll of dry fabric, for example, and may be wrapped around steel mold tool 1502 a number of times to achieve a desired fabric thickness or number of layers. As used herein, "number of" refers to one or more times and/or one or more layers. In an illustrative example, steel mold tool 1502 may be rotated 360 degrees as inner skin 1504 is applied to wrap inner skin 1504 all the way around steel mold tool 1502.

The illustration of inner skin lay-up 1500 in FIGS. 15A and 15B is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 16A:
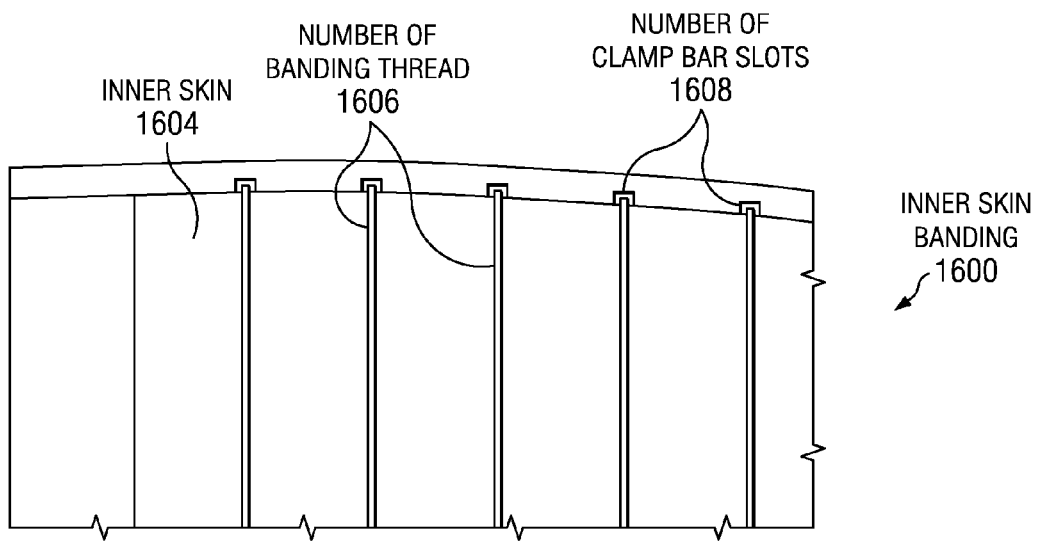
FIGS. 16A and 16B are an inner skin banding in accordance with an advantageous embodiment.
Figure 16B:
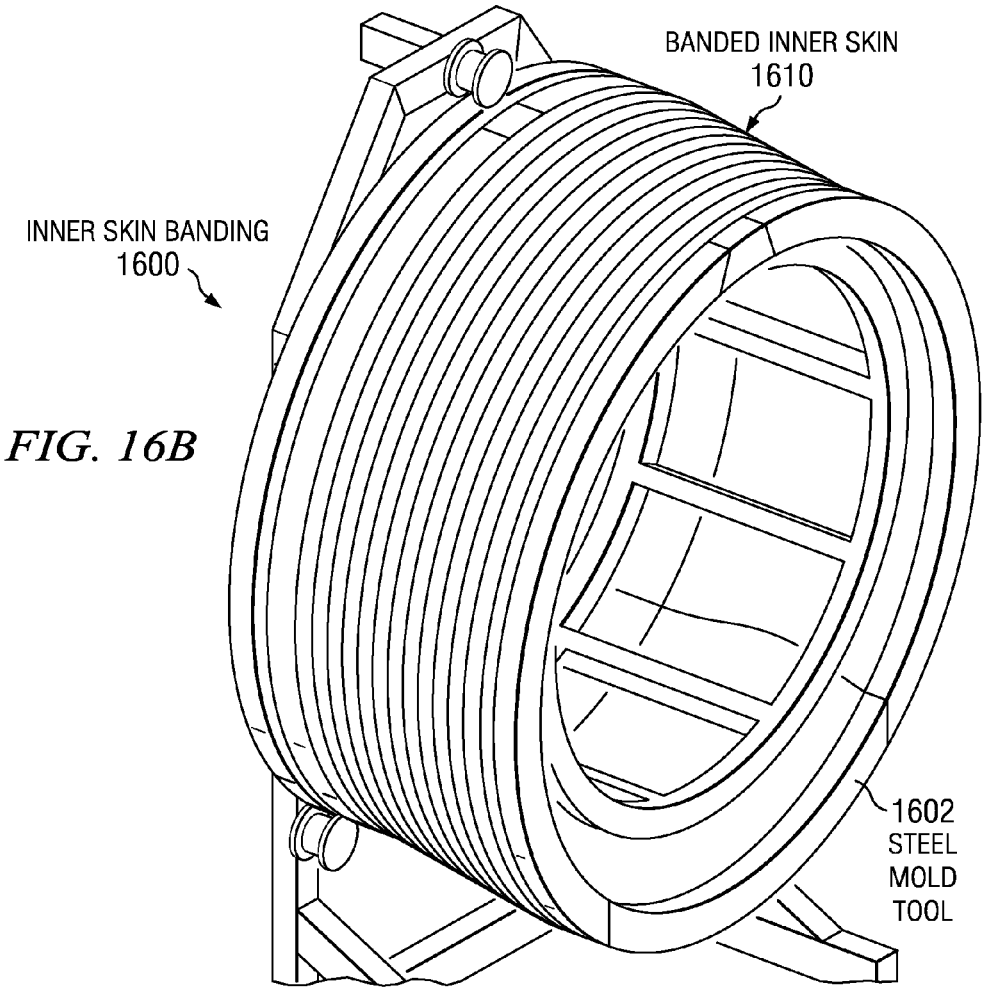

With reference now to FIGS. 16A and 16B, an inner skin banding is depicted in accordance with an advantageous embodiment. Inner skin banding 1600 depicts one implementation of the banding of inner skin 702 in FIG. 7, for example.

Steel mold tool 1602 may be implemented in lay-up position, such as lay-up position 1404 in FIG. 14. Inner skin 1604 in FIG. 16B is banded using number of banding thread 1606 in FIG. 16A. Number of banding thread 1606 is thread that holds fabric, such as inner skin 1604 in hoop tension. Number of banding thread 1606 may be, for example, without limitation, vectran fiber, carbon, cotton, and/or any other suitable thread material.

Banding of inner skin 1604 is the process of wrapping number of banding thread 1606 around inner skin 1604 disposed around steel mold tool 1602 to hold inner skin 1604 against steel mold tool 1602 under tension. Number of clamp bar slots 1608 provides access for number of banding thread 1606 to wrap completely around inner skin 1604. Banded inner skin 1610 in FIG. 16B is then ready for application of a number of septa encapsulated in wax mandrels, such as number of septa 704 in FIG. 7.

The illustration of inner skin banding 1600 in FIGS. 16A and 16B is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 17:
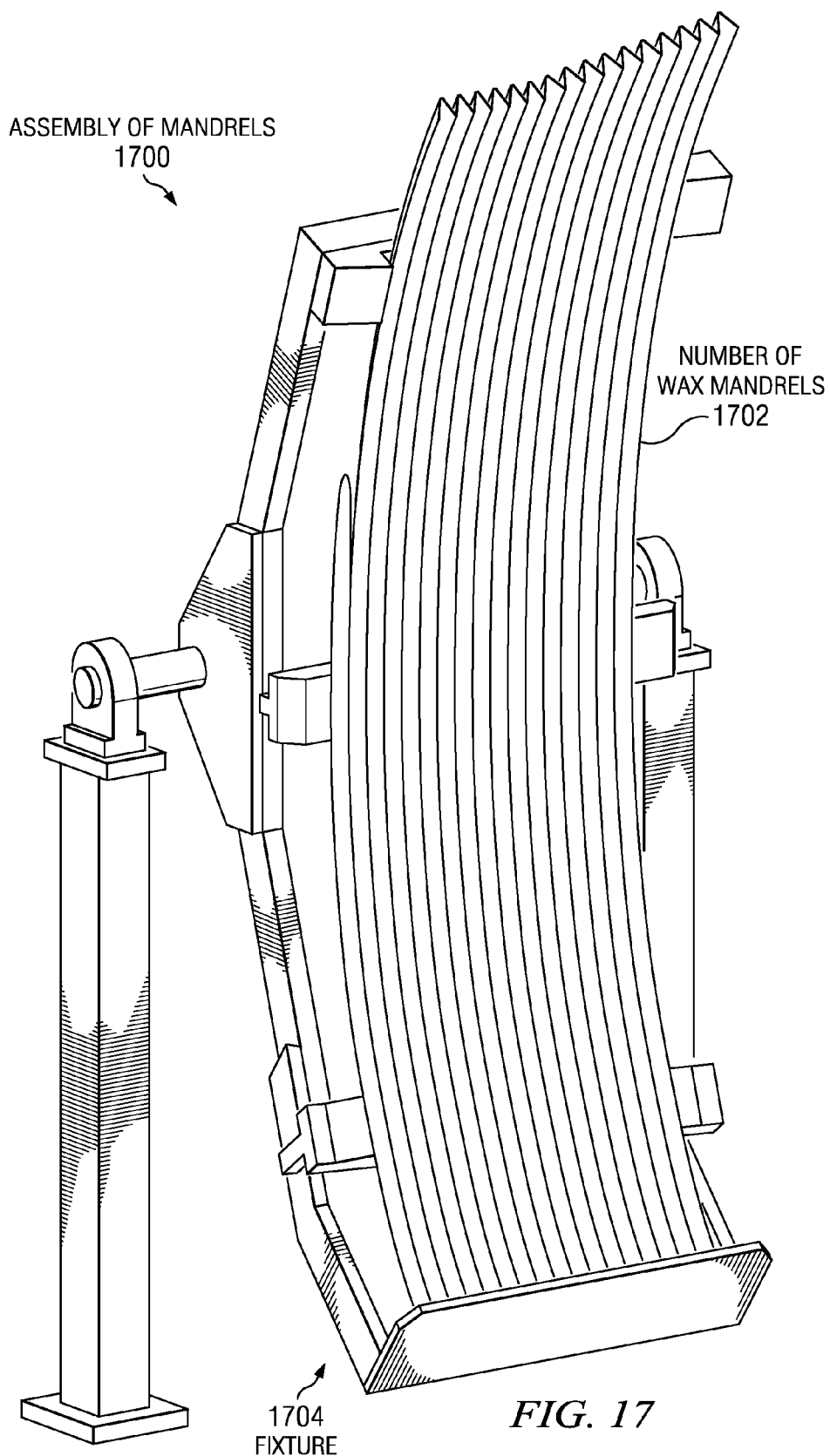
FIG. 17 is an assembly of mandrels in accordance with an advantageous embodiment.

With reference now to FIG. 17, an assembly of mandrels is depicted in accordance with an advantageous embodiment. Assembly of mandrels 1700 depicts one implementation of a number of wax mandrels, such as wax mandrel 1202 in FIG. 12, for example.

Number of wax mandrels 1702 form assembly of mandrels 1700. Number of wax mandrels 1702 may include encapsulated septum detail, such as number of septa 704 in FIG. 7, in one advantageous embodiment. Wax mandrels with encapsulated septum detail are laid up on the banded inner skin of an inner barrel structure, such as banded inner skin 1610 in FIG. 16B, for example.

In another advantageous embodiment, number of wax mandrels 1702 may be pre-configured in a trapezoidal shape, when viewed as a cross-section, to align with the corrugated truss structure of truss core material laid up over wax mandrel sections encapsulated with septum detail, for example. In an illustrative example, wax mandrels without encapsulated septum detail are laid up over the banded truss core fabric that is applied over the wax mandrels with encapsulated septum detail, for example.

Figure 19:
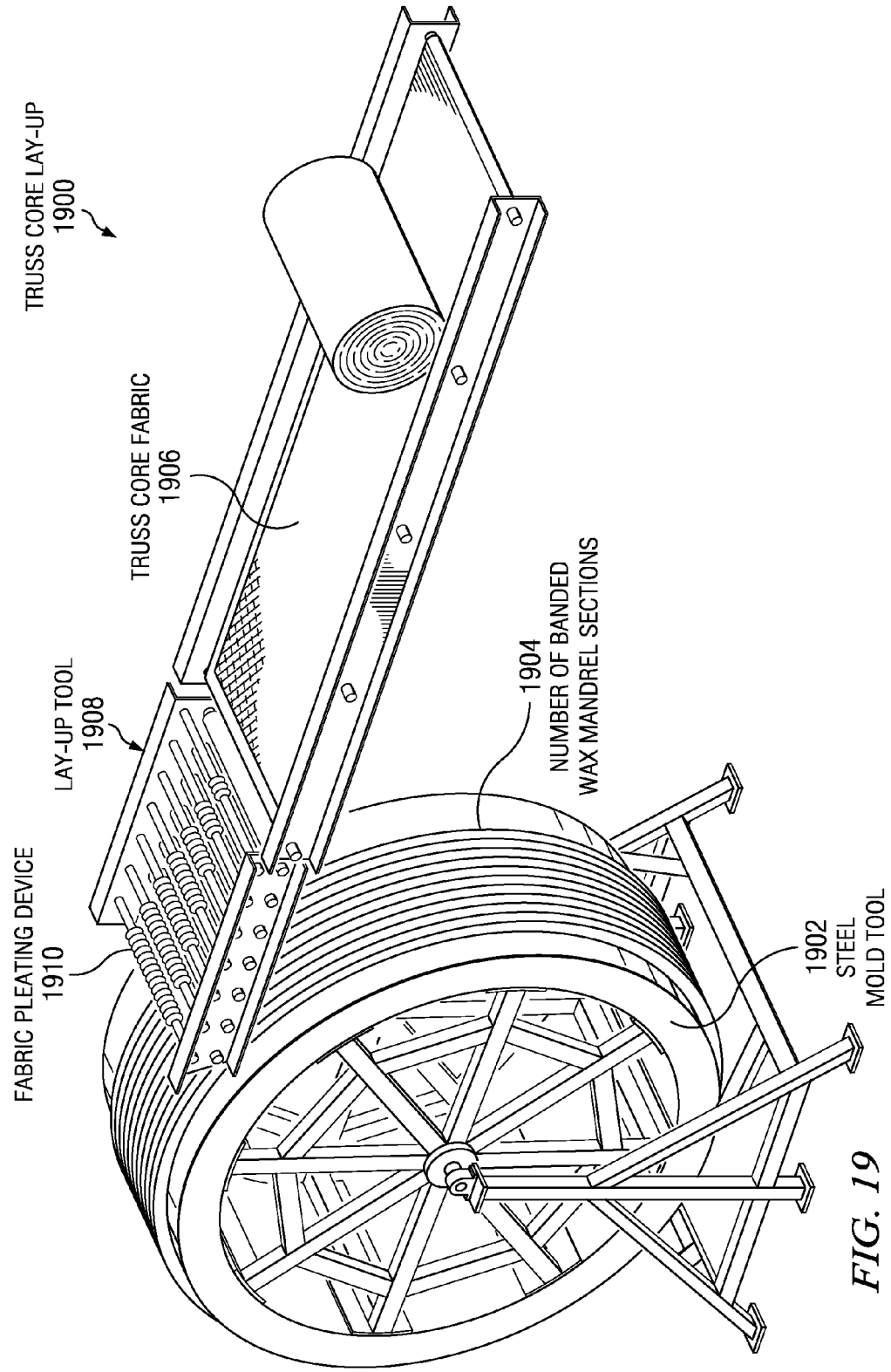
FIG. 19 is a truss core lay-up in accordance with an advantageous embodiment.
Figure 20:
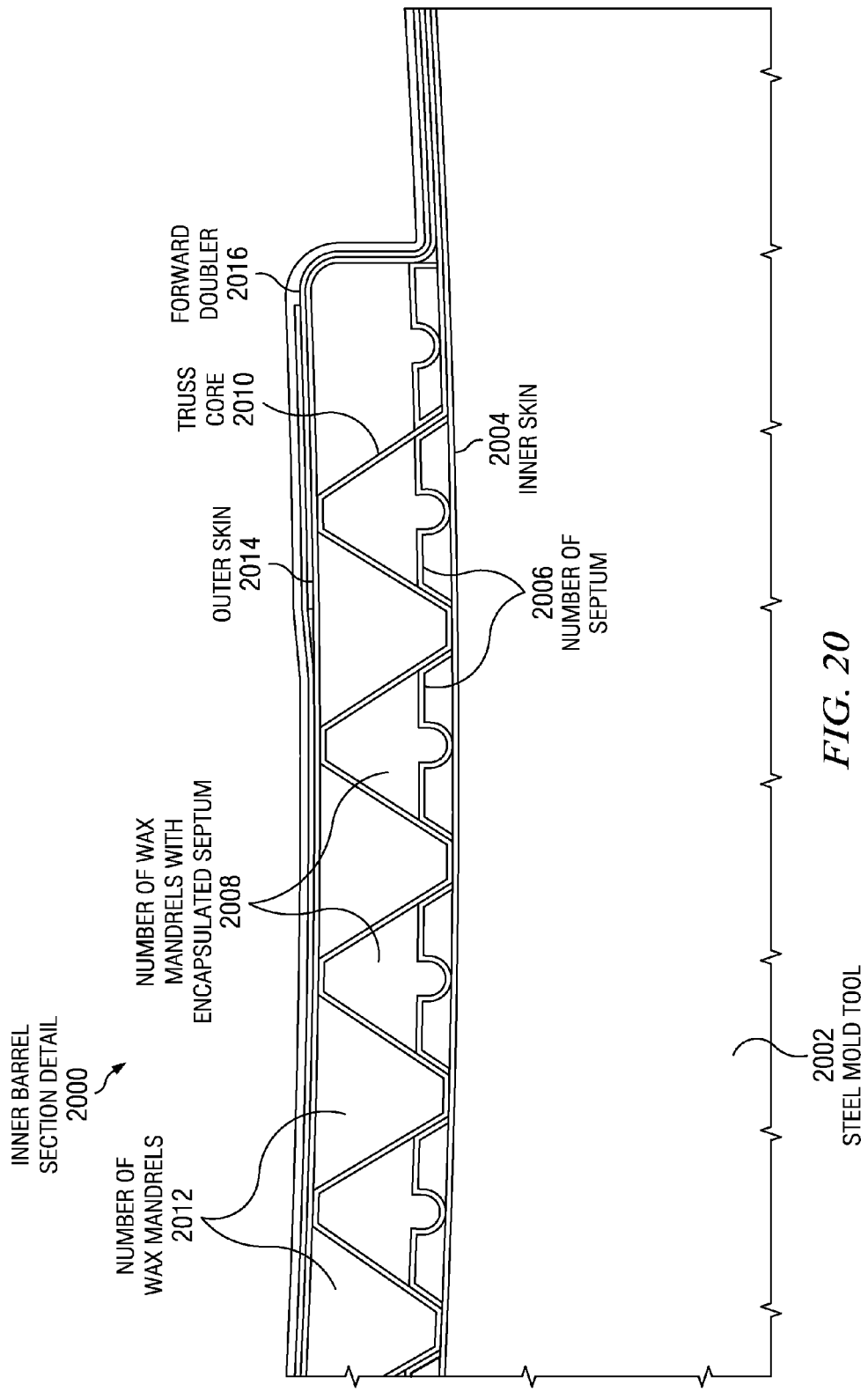
FIG. 20 is an inner barrel section detail in accordance with an advantageous embodiment.

Assembly of mandrels 1700 may be handled by fixture 1704. Fixture 1704 may be an illustrative example of one implementation of number of fixtures 334 in FIG. 3. Fixture 1704 may manipulate and position assembly of mandrels 1700 onto materials laid up on a steel mold tool, such as steel mold tool 1602 in FIG. 16B, for example. In one illustrative example, assembly of mandrels 1700 may include encapsulated septum detail and be applied to a banded inner skin, such as banded inner skin 1610 in FIG. 16B. In another illustrative example, assembly of mandrels 1700 may be applied to a banded truss core fabric, as depicted in FIGS. 19 and 20 that follow.

The illustration of assembly of mandrels 1700 in FIG. 17 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 18:
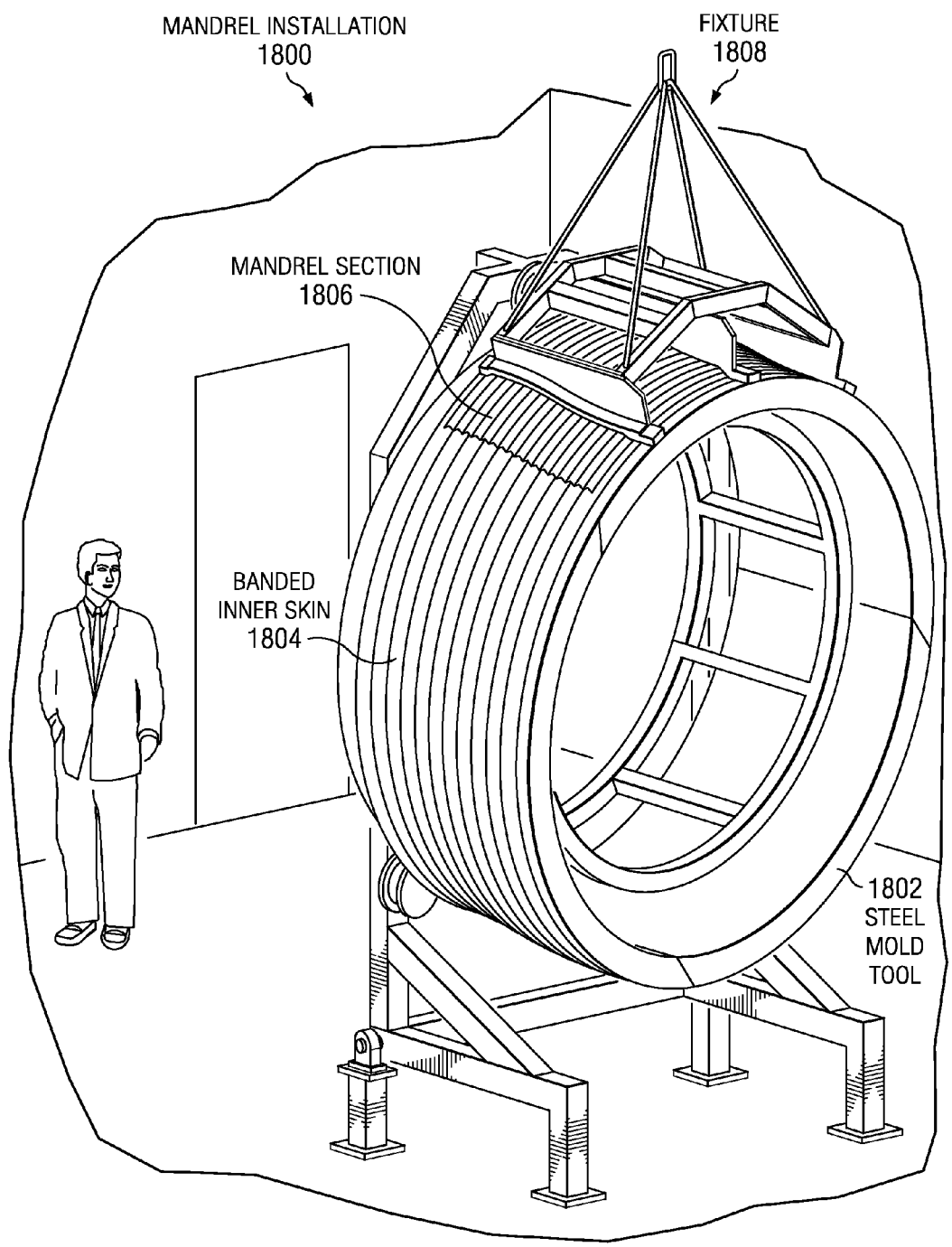
FIG. 18 is a mandrel installation in accordance with an advantageous embodiment.

With reference now to FIG. 18, a mandrel installation is depicted in accordance with an advantageous embodiment. Mandrel installation 1800 depicts one implementation of the installation of assembly of mandrels 1700 in FIG. 17, for example.

Steel mold tool 1802 may be implemented in lay-up position, such as lay-up position 1404 in FIG. 14B. Banded inner skin 1804 is ready for application of wax mandrels, such as assembly of mandrels 1700 in FIG. 17. mandrel section 1806 is an illustrative example of one implementation of assembly of mandrels 1700 in FIG. 17. Fixture 1808 is an illustrative example of one implementation of fixture 1704 in FIG. 17. Fixture 1808 applies mandrel section 1806 to banded inner skin 1804.

Assembly of mandrels will be applied simultaneously with a number of radial ply closeouts, such as radial ply closeout 1308 in FIG. 13. Radial ply closeouts will be applied between each section of the number of mandrel installed. The radial ply closeouts are pre-manufactured in a discrete shape to create a wall between mandrel sections installed. Mandrel installation 1800 applies mandrel sections all the way around banded inner skin 1804 supported by steel mold tool 1802. Following the completion of mandrel installation, the wax mandrels may be banded, similar to the banding of inner skin 1604 in FIG. 16B, to apply tension and hold mandrel sections against the inner skin fabric. Truss core fabric will then be applied over the banded wax mandrel sections.

The illustration of mandrel installation 1800 in FIG. 18 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

With reference now to FIG. 19, a truss core lay-up is depicted in accordance with an advantageous embodiment. Truss core lay-up 1900 depicts one implementation of the application of truss core 706 in FIG. 7, for example.

Steel mold tool 1902 may be implemented in lay-up position, such as lay-up position 1404 in FIG. 14B. Number of banded wax mandrel sections 1904 may be ready for application of truss core fabric 1906. Truss core fabric 1906 is an illustrative example of one implementation of truss core 706 in FIG. 7. Truss core fabric 1906 may be stored as a roll of fabric.

Lay-up tool 1908 may include fabric pleating device 1910 for laying down truss core fabric 1906 over the corrugated shape of number of banded wax mandrel sections 1904 without wrinkling truss core fabric 1906. Steel mold tool 1902 may rotate 360 degrees to wrap a number of layers of truss core fabric 1906 all the way around steel mold tool 1902. The number of layers of truss core fabric 1906 is laid up against number of banded wax mandrel sections 1904. As used herein, "number of" refers to one or more layers.

In an illustrative example, banding thread may be used to band truss core fabric 1906 after truss core fabric 1906 is laid up over number of banded wax mandrel sections 1904. Additional wax mandrel sections are then applied over truss core fabric 1906 and may also be banded to form an additional layer of banded wax mandrel sections. An outer skin is then applied over the additional banded wax mandrel sections to complete the dry assembly of the inner barrel structure. The outer skin may be laid up in a similar fashion to inner skin 1504 in FIGS. 15A and 15B. A number of layers of outer skin may be laid up against the additional wax mandrel sections applied over truss core fabric 1906. In an illustrative example, steel mold tool 1902 may be rotated 360 degrees as the outer skin is applied to wrap the outer skin all the way around steel mold tool 1902. The outer skin is then banded to hold the outer skin against the other elements laid up on steel mold tool 1902 in tension.

The illustration of truss core lay-up 1900 in FIG. 19 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

With reference now to FIG. 20, an inner barrel section detail is depicted in accordance with an advantageous embodiment. Inner barrel section detail 2000 may be an illustrative example of one implementation of the elements depicted in inner barrel section 700 in FIG. 7 and inner barrel section 1000 in FIG. 10 in a three-dimensional dry assembly before resin infusion or curing, for example.

Inner barrel section detail 2000 depicts a number of elements laid up on steel mold tool 2002. Inner skin 2004 is adjacent to, or disposed along, steel mold tool 2002. Number of septa 2006 is laid up on inner skin 2004 through the installation of number of wax mandrels with encapsulated septum 2008. Truss core 2010 is laid up over number of wax mandrels with encapsulated septum 2008. Number of wax mandrels 2012 is depicted as applied over truss core 2010. Outer skin 2014 is laid up over number of wax mandrels 2012. Forward doubler 2016 is then laid up at the forward end of the inner barrel section with the same fabric used to form outer skin 2014. Additional materials are then applied to outer skin 2014, including release ply and flow media.

Release ply is a release material placed between the dry fabric of outer skin 2014 and a flow media. A flow media is a porous material with low non-linearity factor, which is used to introduce and evenly spread a substance, such as resin for example, across a surface. The release ply provides a medium that disposes flow media evenly across the inner barrel outer surface while preventing flow media from sticking to the dry assembly part. Following a flow media application process, such as resin infusion, the release ply may be used to remove the flow media from the inner barrel part. Release ply and flow media may be discarded following a resin infusion process, for example.

The illustration of inner barrel section detail 2000 in FIG. 20 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 21:
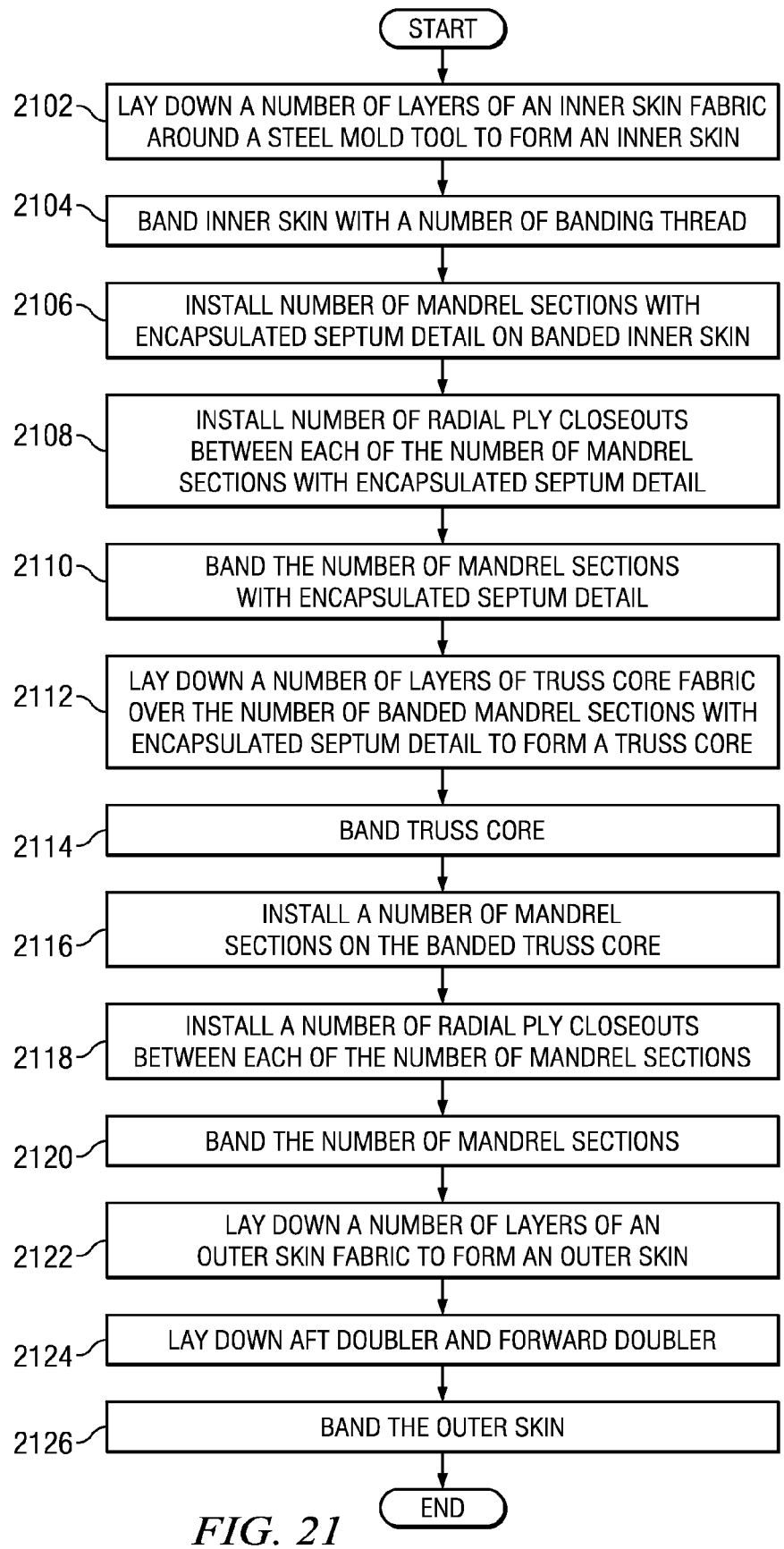
FIG. 21 is a flowchart illustrating a process for assembling a barrel structure in accordance with an advantageous embodiment.

With reference now to FIG. 21, a flowchart illustrating a process for assembling a barrel structure is depicted in accordance with an advantageous embodiment. The process in FIG. 21 may be implemented using one or more of the elements depicted in FIG. 7 for inner barrel section 700, FIG. 10 for inner barrel section 1000, and/or FIG. 11 for inner barrel section detail 1100.

The process begins by laying down a number of layers of an inner skin fabric around a steel mold tool to form an inner skin (operation 2102). The steel mold tool may be, for example, steel mold tool 1400 in FIGS. 14A and 14B. The inner skin is a dry fabric that forms one or more of the skin elements for inner barrel 500 in FIG. 5, for example. The inner skin may be, for example, without limitation, a woven fabric, a uni-directional tape, warp/knit fabric, braided fabric, stitched fabric, and/or any other suitable fabric.

The process bands the inner skin with a number of banding thread (operation 2104). The number of banding thread is thread that holds fabric, such as the inner skin laid down in operation 2102, in hoop tension. The number of banding thread may be, for example, without limitation, vectran fiber, carbon, cotton, and/or any other suitable thread material. The inner skin is banded using the number of banding thread to form a banded inner face sheet, such as banded inner skin 1610 in FIG. 16B, for example.

The process next installs a number of mandrel sections with encapsulated septum detail on the banded inner skin (operation 2106). The number of mandrel sections may be, for example, assembly of mandrels 1700 in FIG. 17. The process installs a number of radial ply closeouts between each of the number of mandrel sections with encapsulated septum detail (operation 2108). The number of radial ply closeouts is installed perpendicular to the length of the number of mandrel sections to form a wall or divide between each of the number of mandrel sections as they are installed around the banded inner skin on the steel mold tool. The number of radial ply closeouts has a discrete shape that correspond to the shape of the wax mandrel sections and provide walls between the cavities that remain when the wax mandrels are melted out during a post-cure melt out process.

The process then bands the number of mandrel sections with encapsulated septum detail (operation 2110). The banding of the mandrel sections may be similar to the banding of the inner skin, using a number of banding threads to secure the number of mandrel sections to the banded inner skin around the steel mold tool with tension.

Next, the process lays down a number of layers of truss core fabric over the number of banded mandrel sections with encapsulated septum detail to form a truss core (operation 2112). The truss core fabric is a dry fabric that forms the truss element of an inner barrel structure, such as inner barrel 500 in FIG. 5, for example. The truss core fabric may be, for example, without limitation, a woven fabric, a uni-directional tape, warp/knit fabric, plain weave fabric, braided fabric, stitched fabric, and/or any other suitable fabric. The truss core fabric may be stored on a roll and laid up over the number of mandrel sections with encapsulated septum detail using a lay-up tool, such as lay-up tool 1908 in FIG. 19. The lay-up tool may include a pleating device, such as fabric pleating device 1910 in FIG. 19, for laying down the truss core fabric over the corrugated surface of the number of mandrel sections without wrinkling the truss core fabric.

The process then bands the truss core (operation 2114) using banding threads to secure the truss core against the wax mandrel sections with tension. The process installs a number of mandrel sections on the banded truss core (operation 2116). The number of mandrel sections may be, for example, wax mandrels, such as number of wax mandrels 2012 and number of wax mandrels with encapsulated septum 2008 in FIG. 20. The process installs a number of radial ply closeouts between each of the number of mandrel sections (operation 2118), and then bands the number of mandrel sections (operation 2120).

Next, the process lays down a number of layers of an outer skin fabric to form an outer skin (operation 2122) against the banded number of mandrel sections. Additional layers of fabric are then laid up and positioned at the forward and aft ends of the inner skin, mandrels, truss core, and outer skin preform assembly to form local buildup or doublers at the aft and forward ends of the inner barrel assembly. The process then lays down an aft doubler and forward doubler (operation 2124). Rigid tooling details, such as steel mandrels, for example, are placed forward and aft of the outer skin wall and on top of the outer skin flange to establish and maintain critical interfacing surfaces with the leading edge and engine fan case components. The process then bands the outer skin (operation 2126), with the process terminating thereafter.

Figure 22:
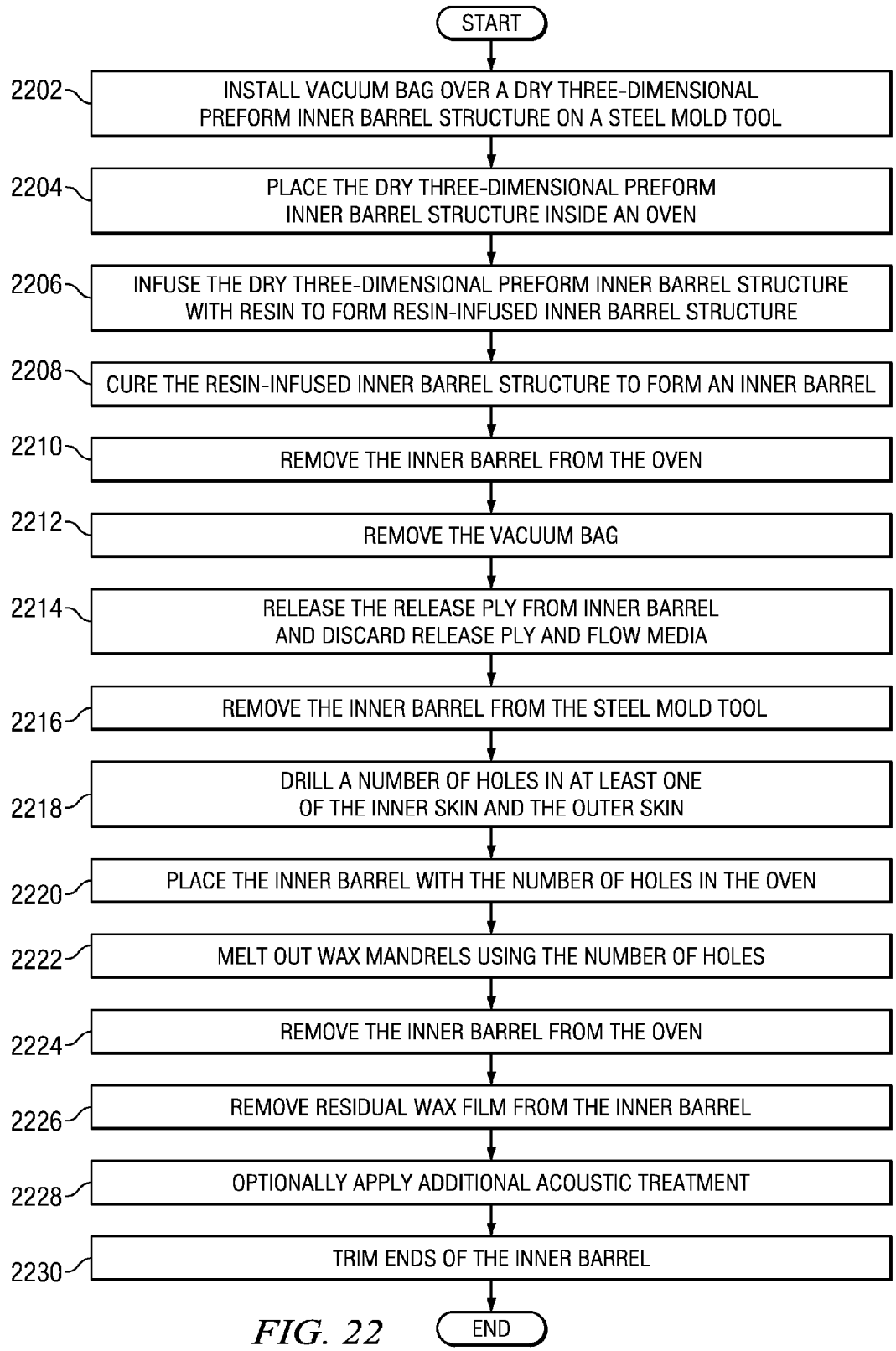
FIG. 22 is a flowchart illustrating a process for forming a barrel structure in accordance with an advantageous embodiment.

The dry three-dimensional preform inner barrel structure that results from the process in FIG. 21 may then be unitized, as described in more detail in FIG. 22.

With reference now to FIG. 22, a flowchart illustrating a process for forming a barrel structure is depicted in accordance with an advantageous embodiment.

The process begins by installing a vacuum bag over a dry three-dimensional preform inner barrel structure on a steel mold tool (operation 2202), such as the structure described in FIG. 21. The vacuum bagging compacts the dry materials together using pressure prior to the resin-infusion and cure processes that complete the unitization of the inner barrel. A vacuum is applied to the mold tool to remove the air molecules under the vacuum bag. The process places the dry three-dimensional preform inner barrel structure inside an oven (operation 2204).

The process infuses the dry three-dimensional preform inner barrel structure with resin to form resin-infused inner barrel structure (operation 2206). The resin-infusion occurs at a temperature that is lower than the melting point of the wax mandrels in the inner barrel structure. In one illustrative example, the resin infusion process within the oven may occur at approximately 140 degrees Fahrenheit.

The process cures the resin-infused inner barrel structure to form an inner barrel (operation 2208). The process may cure the resin-infused inner barrel structure in the oven at a temperature higher than the temperature used for resin infusion, but lower than a temperature that would melt the wax mandrels, for example. One illustrative example of a curing temperature for the resin-infused inner barrel structure may be approximately 200 degrees Fahrenheit. The resin curing unitizes the inner barrel structure, bonding the skin, septum, and truss core elements together. The process then removes the inner barrel from the oven (operation 2210) and removes the vacuum bag (operation 2212). The process releases the release ply from the inner barrel and discards the release ply and flow media (operation 2214). Next, the process removes the inner barrel from the steel mold tool (operation 2216).

The process drills a number of holes in at least one of the inner skin and the outer skin (operation 2218). The number of holes may be used for wax melt out of the wax mandrels in operation 2222 and/or acoustic treatment of the inner barrel. The number of holes may be drilled with a tool such as, for example, without limitation, a laser, a mechanical drill, and/or any other suitable tool. The inner barrel may cool down once removed from the oven in operation 2210 and prior the drilling step in operation 2218. Holes may also be formed in-situ with the resin infusion process using pin mats positioned between the steel mold tool and inner skin. The pin mat is subsequently removed after resin The process places the inner barrel with the number of holes in the oven (operation 2220). The process then melts out the wax mandrels using the number of holes (operation 2222).

In an illustrative example, the post-cure wax melt out may occur at a temperature higher than that of the temperatures used for resin-infusion and the initial cure of the resin-infused inner barrel. The temperature used in the oven for the wax melt-out may be a temperature at which the wax mandrels are engineered to melt, for example. In one illustrative example, the wax mandrels may be engineered to remain rigid at temperatures upwards of 200 degrees Fahrenheit or more and melt at approximately 350 degrees Fahrenheit. In this example, the wax mandrels are configured to withstand the resin-infusion temperature of 140 degrees Fahrenheit and the initial cure temperature of 200 degrees Fahrenheit, retaining a rigid state until a higher temperature, such as 350 degrees Fahrenheit, is reached during a post-cure melt out phase. The number of holes drilled in operation 2218 allows the melted wax mandrels to flow out of the inner barrel structure during the melt out step in operation 2222. The wax mandrels may also be engineered to withstand one atmospheric pressure, 14.7 psi, without deforming.

The process then removes the inner barrel from the oven (operation 2224). The process removes residual wax film from the inner barrel (operation 2226). Residual wax film may remain within the interior of the barrel structure along the cavities where the wax mandrels were implemented prior to melting out, for example. The wax film removal may be accomplished using a number of techniques, such as, for example, without limitation, a solvent bath, ultrasonic cleaning, and/or any other suitable technique.

The process may optionally apply additional acoustic treatment (operation 2228). The additional acoustic treatment may be, for example, without limitation blowing in bulk absorber material into the number of cavities resulting from the space left by the wax mandrels after wax melt out in operation 2222.

The process then trims the ends of the inner barrel (operation 2230), with the process terminating thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments take into account and recognize a number of different considerations. For example, the different advantageous embodiments take into account and recognize that current methods of design and production for engine nacelles involve a multi-step process utilizing pre-impregnated materials and multiple autoclave cures to produce a composite inner barrel structure. This current approach requires the use of core material in honeycomb or other form, often in two layers separated by a septum or mid-skin element to meet the structural and acoustic performance requirements. This approach also requires the use of an autoclave, which is expensive to operate and maintain with a limited supplier base.

The different advantageous embodiments further take into account and recognize that current core and septum materials are often sole sourced and expensive. The current methods require co-bonding of skins, such as face sheets, mid-skin, and septum elements, in multiple steps using autoclave cure processes. The pre-impregnated materials, film adhesives, and other materials require subzero storage and have a limited "out-time" of approximately thirty days in which the materials must be laid up, vacuum bagged, and autoclave process cured. These requirements place time and cost constraints on the manufacturing of engine nacelle inner barrel structures.

Thus, the different advantageous embodiments provide a one-step cure process for forming a unitized inner barrel structure without the use of an autoclave. This process results in shorter cycle time and turn around on the mold tool, and a cost benefit by use of the lower cost oven over the autoclave. Vacuum bag installation is only required once during this advantageous process, and only two heat cycles within a oven are needed to complete the part.

The different advantageous embodiments further provide a unitized one-piece design build inner barrel having a truss design with an integral septum detail. The inner barrel is formed in a one-step cure process with melt-out wax mandrels in a oven. The materials do not require sub-zero storage or autoclave cure processes. The dry fabrics used to produce the inner barrel have an unlimited out time as opposed to the thirty day out time for current state of the art designs. The unitized structure provides a single joint interface for each of the three sub-components that is superior to the multiple splice joints needed for the current state of the art structures.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An inner barrel structure of an engine nacelle, the inner barrel structure comprising: an inner skin formed by laying down a number of layers of an inner skin fabric around a steel mold tool and using a number of banding threads to hold the inner skin against a steel mold tool in tension;
   A truck core disposed with respect to the inner skin to define a cavity; and
   A septum disposed in the cavity.
2. The inner barrel structure of claim 1, wherein the truss core is disposed at an inner surface of the inner skin such that a plurality of cavities are defined therebetween, further comprising a plurality of septa respectively disposed in the plurality of cavities.
3. The inner barrel structure of claim 2, wherein the plurality of septa are configured for attenuating noise.
4. The inner barrel structure of claim 1 further comprising:
   an outer skin disposed in a space relationship with the inner skin; and
   a radial ply closeout disposed between the inner and outer skins.
5. The inner barrel structure of claim 1, further comprising absorber material disposed in the cavity.
6. The inner barrel structure of claim 5, wherein the absorber material is disposed between the truss core and the septum.
7. The inner barrel structure of claim 1, wherein the septum includes a stiffening portion.
8. The inner barrel structure of claim 7, wherein the stiffening portion is configured substantially channel-like.
9. The inner barrel structure of claim 7, wherein the stiffening portion includes acoustically configured perforations.
10. The inner barrel structure of claim 7, wherein the stiffening portion contacts the inner skin.
11. An engine nacelle comprising the inner barrel structure according to claim 1.
12. An aircraft comprising a plurality of engine nacelles according to claim 1.
13. A method for assembling a barrel structure, the method comprising:
    laying down a number of layers of an inner skin fabric around a steel mold tool to form an inner skin;
    installing a number of mandrel sections with encapsulated septum detail on the inner skin;
    installing a first number of radial ply closeouts between each of the number of mandrel sections with encapsulated septum detail installed;
    laying down a number of layers of truss core fabric over the number of mandrel sections with encapsulated septum detail to form a truss core;
    installing a number of mandrel sections on the truss core; installing a second number of radial ply closeouts between each of the number of mandrel sections; and
    laying down a number of layers of an outer skin fabric against the number of mandrel sections to form an outer skin;
    banding the inner skin using a number of banding ihreads to hold the inner skin against the steel mold tool in tension.
14. The method of claim 13 further comprising:
    laying down an aft doubler and a forward doubler against the outer skin.
15. A method of fabricating an inner barrel structure of an engine nacelle, the method comprising infusing with resin a portion of the inner barrel structure according to any of claim 14.
16. The method of claim 15 further comprising utilizing sacrificial mandrel sections that are removable by melting.
17. The method of claim 15 further comprising holding the inner skin against a mold tool.
18. The method of claim 15 further comprising holding the truss core against the mandrel sections with encapsulated septum detail in tension.
19. The method of claim 15, wherein the infusing step occurs at a temperature that is lower than the melting point of a number of wax mandrels in the inner barrel.
20. The method of claim 15, wherein the curing step cure occurs at a temperature higher than the temperature used for the infusing step, but lower than a temperature at which the number of wax mandrels is engineered to melt.
21. The method of claim 13, wherein the number of banding threads are selected from at least one of vectran fiber, carbon, and cotton.
22. A method of attenuating engine noise comprising installing onto an aircraft a plurality of engine nacelles according to claim 21.
23. The method of claim 13, further comprising:
    banding the number of mandrel sections with encapsulated septum detail using a number of banding threads to hold the number of mandrel sections with encapsulated septum detail against the inner skin in tension.
24. The method of claim 13 further comprising:
    banding the truss core using the number of banding thread; to hold the truss core against the number of mandrel sections with encapsulated septum detail in tension.

25. The method of claim 13 further comprising:
banding the outer skin using the number of banding threads to hold the outer skin against the number of mandrel sections in tension.

26. The method of claim 13, wherein the inner skin fabric is at least one of a woven fabric, a uni-directional tape, warp/knit fabric, braided fabric, stitched fabric, and/or any other suitable fabric.

27. The method of claim 13, wherein the outer skin fabric is at least one of a woven fabric, a uni-directional tape, warp/knit fabric, braided fabric, stitched fabric, and/or any other suitable fabric.

28. The method of claim 27 wherein said forming further comprises disposing a truss core at an inner skin of the barrel structure such that the plurality of cavities are defined therebetween.

29. The method of claim 27 wherein said disposing further comprises disposing a plurality of perforated septa respectively in the cavities.

30. The method of claim 27 further comprising disposing absorbing material in the cavities.

31. The method of claim 13, wherein the truss core fabric is at least one of a woven fabric, a uni-directional tape, warp/knit fabric, braided fabric, stitched fabric, and/or any other suitable fabric.

32. The method of claim 13, wherein the first number of radial ply closeouts is installed perpendicular to the length of the number of mandrel sections with encapsulated septum detail to form a wall or divide between each of the number of mandrel sections with encapsulated septum detail as they are installed around the inner skin on the steel mold tool.

33. The method of claim 32 wherein said disposing further comprises disposing a plurality of septa each including a stiffening portion.

34. The method of claim 13, wherein the second number of radial ply closeouts is installed perpendicular to the length of the number of mandrel sections to form a wall or divide between each of the number of mandrel sections as they are installed around the truss core on the steel mold tool.

35. A method for forming a barrel structure, the method comprising: installing a vacuum bag over a dry three-dimensional preform inner barrel structure on a steel mold tool, the preform inner barrel structure having an inner skin formed by laying down a number of layers of an inner skin fabric around the steel mold tool and using a number of banding threads to hold the inner skin against the steel mold tool in tension;
placing the dry three-dimensional preform inner barrel structure inside an oven;
infusing the dry three-dimensional preform inner barrel structure with resin to form a resin-infused inner barrel structure;
curing the resin-infused inner barrel structure to form an inner barrel; removing the inner barrel from the oven; removing the vacuum bag; removing the release ply from the inner barrel and discarding a release ply and flow media;
removing the inner barrel from the steel mold tool; and
drilling a number of holes in at least one of an inner skin and an outer skin of the inner barrel.

36. The method of claim 35 further comprising:
placing the inner barrel with the number of holes in the oven;
melting out a number of wax mandrels from the inner barrel through the number of holes drilled;
removing the inner barrel from the oven; and
removing residual wax film from the inner barrel.

37. The method of claim 36 further comprising:
applying additional acoustic treatment to the inner barrel.

38. The method of claim 36, wherein the number of wax mandrels is engineered to maintain rigidity at one atmosphere of applied pressure by the vacuum bag and a temperature used for the infusing step and a temperature used for the curing step, and wherein the number of wax mandrels is engineered to melt at a temperature higher than the temperature used for the infusing step and the temperature used for the curing step.

39. The method of claim 36, wherein the removing residual wax film from the inner barrel step uses a technique selected from at least one of a solvent bath and ultrasonic cleaning.

40. A method of manufacturing an inner barrel structure of an engine nacelle, the method comprising:
forming a plurality of cavities between an inner skin and an outer skin of the barrel structure, the inner barrel structure having an inner skin formed by laying down a number of layers of an inner skin fabric around the steel mold tool and using a number of banding thread to hold the inner skin against the steel mold tool in tension; and
disposing a noise-attenuating structure within the cavities.

* * * * *